United States Patent
Nakazawa et al.

(10) Patent No.: US 10,633,032 B2
(45) Date of Patent: Apr. 28, 2020

(54) VEHICLE REAR PORTION STRUCTURE

(71) Applicant: NIPPON STEEL & SUMITOMO METAL CORPORATION, Tokyo (JP)

(72) Inventors: Yoshiaki Nakazawa, Tokyo (JP); Ryuichi Nishimura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 131 days.

(21) Appl. No.: 16/065,882

(22) PCT Filed: Jan. 6, 2017

(86) PCT No.: PCT/JP2017/000223
§ 371 (c)(1),
(2) Date: Jun. 25, 2018

(87) PCT Pub. No.: WO2017/119472
PCT Pub. Date: Jul. 13, 2017

(65) Prior Publication Data
US 2019/0009828 A1 Jan. 10, 2019

(30) Foreign Application Priority Data
Jan. 6, 2016 (JP) .................. 2016-000881

(51) Int. Cl.
*B60J 7/00* (2006.01)
*B62D 25/08* (2006.01)
(Continued)

(52) U.S. Cl.
CPC ............. *B62D 25/08* (2013.01); *B62D 21/02* (2013.01); *B62D 21/152* (2013.01);
(Continued)

(58) Field of Classification Search
CPC .... B62M 27/02; B60F 1/005; B60G 2400/61; B60G 5/047; B60Q 1/0005; B60K 15/073;
(Continued)

(56) References Cited

U.S. PATENT DOCUMENTS 4,950,031 A * 8/1990 Mizunaga ............ B62D 21/152
293/155
5,002,333 A * 3/1991 Kenmochi ............. B62D 21/10
296/204
(Continued)

FOREIGN PATENT DOCUMENTS

JP 59-9982 U 1/1984
JP 2000-1185 A 1/2000
(Continued)

OTHER PUBLICATIONS

International Search Report for PCT/JP2017/000223 dated Mar. 7, 2017.
(Continued)

*Primary Examiner* — Kiran B Patel
(74) *Attorney, Agent, or Firm* — Birch, Stewart, Kolasch & Birch, LLP

(57) ABSTRACT

[Object] To achieve a weight reduction of a car body structure while maintaining collision safety to impacts from the rear side of the vehicle.
[Solution] Provided is a vehicle rear portion structure 1 including a pair of rear frames 4 provided in the vehicle length direction and a rear floor panel 2 joined to the pair of rear frames 4, in which the rear floor panel 2 has a concave section 3 provided from the rear side of the vehicle toward the front side of the vehicle of the rear floor panel 2, and the concave section 3 is formed of a metal sheet having a tensile strength more than or equal to the tensile strength of the pair of rear frames 4. By this configuration, when an impact load
(Continued)

from the rear side of the vehicle acts on the concave section 3 of the rear floor panel 2, the rear floor panel 2 can absorb collision energy in a principal way. Thus, the burden of absorption of collision energy by the rear frames 4 is reduced, and accordingly it becomes possible to reduce the wall thickness and the length of the rear frame 4 and a weight reduction of the entire car body structure is achieved.

20 Claims, 20 Drawing Sheets

(51) Int. Cl.
*B62D 29/00* (2006.01)
*B62D 25/20* (2006.01)
*B62D 21/02* (2006.01)
*B62D 21/15* (2006.01)

(52) U.S. Cl.
CPC .......... *B62D 25/087* (2013.01); *B62D 25/20* (2013.01); *B62D 25/2027* (2013.01); *B62D 29/007* (2013.01)

(58) Field of Classification Search
CPC ..... B60R 19/24; B60T 8/1755; B62K 15/006; B65D 2571/00141
See application file for complete search history.

(56) References Cited

U.S. PATENT DOCUMENTS

| | | | | |
|---|---|---|---|---|
| 5,114,184 A * | 5/1992 | Shimomura | ......... | B62D 21/155 280/784 |
| 5,174,628 A * | 12/1992 | Hayatsugu | ............. | B60K 15/03 296/187.11 |
| 5,924,734 A * | 7/1999 | Fukagawa | .............. | B60K 15/07 220/4.14 |
| 2003/0184124 A1* | 10/2003 | Yamaguchi | .......... | B62D 21/152 296/204 |
| 2006/0087109 A1* | 4/2006 | Kusu | ....................... | B60K 13/04 280/831 |
| 2006/0113131 A1* | 6/2006 | Kato | ........................ | B60K 1/04 429/434 |
| 2009/0195030 A1* | 8/2009 | Yamaguchi | .......... | B62D 21/152 296/193.08 |
| 2009/0195032 A1* | 8/2009 | Yamaguchi | ........ | B62D 25/2027 296/203.04 |
| 2010/0072786 A1* | 3/2010 | Koyama | .............. | B62D 25/087 296/203.04 |
| 2011/0001337 A1* | 1/2011 | Patschicke | ........... | B62D 25/087 296/193.07 |
| 2011/0168468 A1* | 7/2011 | Taguchi | ................... | B60K 1/02 180/65.245 |
| 2011/0215617 A1* | 9/2011 | Izutsu | .................. | B62D 21/152 296/203.04 |
| 2011/0260503 A1* | 10/2011 | Fujii | ...................... | B62D 21/11 296/205 |
| 2011/0298246 A1* | 12/2011 | Mildner | ............. | B62D 25/2027 296/193.07 |
| 2012/0119545 A1* | 5/2012 | Mildner | ................. | B62D 25/20 296/193.07 |
| 2012/0256446 A1 | 10/2012 | Yasuhara et al. | | |
| 2013/0200654 A1* | 8/2013 | Ogawa | ................. | B62D 25/082 296/187.11 |
| 2013/0278011 A1* | 10/2013 | Matsuyama | .......... | B62D 35/02 296/180.2 |
| 2014/0070566 A1* | 3/2014 | Ogawa | ................. | B62D 25/087 296/187.11 |
| 2014/0159428 A1* | 6/2014 | Katou | .................. | B62D 25/087 296/193.08 |
| 2015/0084376 A1 | 3/2015 | Shigihara | | |
| 2016/0264184 A1* | 9/2016 | Ishihara | ................. | B23K 11/00 |
| 2017/0057548 A1* | 3/2017 | Yamada | ................ | B62D 25/087 |
| 2017/0073019 A1* | 3/2017 | Kabayama | ........... | B62D 21/155 |
| 2017/0113541 A1* | 4/2017 | Muramatsu | ........... | B60K 15/07 |
| 2017/0305474 A1* | 10/2017 | Ryan | ..................... | B62D 29/004 |
| 2018/0037270 A1* | 2/2018 | Kawabe | ................ | B62D 25/20 |
| 2018/0304935 A1* | 10/2018 | Nakamura | ........... | B62D 25/087 |
| 2019/0023237 A1* | 1/2019 | Lehman | .................... | B60S 9/04 |
| 2019/0047393 A1* | 2/2019 | Kato | ........................ | B60L 50/64 |
| 2019/0106151 A1* | 4/2019 | Berman | ................ | B62D 21/152 |
| 2019/0144038 A1* | 5/2019 | Takahashi | ............ | B62D 25/025 296/193.07 |

FOREIGN PATENT DOCUMENTS

| | | |
|---|---|---|
| JP | 2000-110340 A | 4/2000 |
| JP | 2001-18859 A | 1/2001 |
| JP | 2002-97447 A | 4/2002 |
| JP | 2004-291714 A | 10/2004 |
| JP | 2006-312396 A | 11/2006 |
| JP | 2009-208593 A | 9/2009 |
| JP | 2013-67308 A | 4/2013 |
| JP | 2015-66994 A | 4/2015 |
| JP | 2015-89759 A | 5/2015 |

OTHER PUBLICATIONS

Written Opinion of the International Searching Authority for PCT/JP2017/000223 (PCT/ISA/237) dated Mar. 7, 2017.
English translation of Written Opinion of the International Searching Authority for PCT/JP2017/000223 (PCT/ISA/237) dated Mar. 7, 2017.
Extended European Search Report, dated Oct. 17, 2019, for European Application No. 17736009.6.
Indian Office Action, dated Dec. 30, 2019, for Indian Application No. 201817023762, with an English translation.

* cited by examiner

REAR SIDE OF VEHICLE

REAR SIDE OF VEHICLE

REAR SIDE OF VEHICLE

REAR SIDE OF VEHICLE

VEHICLE REAR PORTION STRUCTURE

TECHNICAL FIELD

The present invention relates to a vehicle rear portion structure.

BACKGROUND ART

These days, improvements in the fuel efficiency of automobiles are required from the viewpoint of global environment protection. On the other hand, the maintenance and improvement of collision safety of vehicles are required. In order to satisfy these requirements, high-strength, lightweight car body structures are being developed. For example, the use of a thin-walled, high-strength steel sheet is promoted mainly for a framework member such as a frame or a pillar.

A pair of rear frames, which are each a framework member and are provided at left and right in a rear portion of a vehicle, absorb collision energy by bringing about bending deformation due to an impact load from the rear side of the vehicle. Technology to improve the impact energy absorption capacity by such rear frames is being developed.

For example, Patent Literature 1 below discloses a technology regarding a rear frame in which a bead section is provided in a bottom wall section and a flection section that flexes to the inside is provided in a vertical wall section. By this technology, the bending deformation load generated by an impact load can be increased. That is, the capacity of collision energy absorption by the rear frame is improved. Further, Patent Literature 2 below discloses a rear floor structure that includes a rear floor panel formed of a soft steel sheet and rear frames formed of a high-tensile steel material having a higher strength than the rear floor panel. By this technology, the amount of collision energy absorbed can be increased while the amount of deformation of the car body with respect to the impact load is kept small.

CITATION LIST

Patent Literature

Patent Literature 1: JP 2015-89759A
Patent Literature 2: JP 2004-291714A

SUMMARY OF INVENTION

Technical Problem

In order to meet the fuel efficiency standard of automobiles, which may be made stricter in the future, it is required that the weight of the car body structure be further reduced. However, when it is attempted to further reduce the wall thickness of a framework member such as a rear frame, the rear frame undergoes not desired bending deformation but cross-sectional crushing when an impact load in the axial direction of the member is acting. Hence, it is difficult to obtain an amount of plastic work associated with desired bending deformation (i.e., an amount of collision energy absorbed), and there are many cases where the collision energy absorption capacity is lower than the capacity envisaged at the time of design. Consequently, in a structure in which rear frames are caused to absorb collision energy in a principal way like in the technologies disclosed in Patent Literatures 1 and 2 above, it is difficult to achieve both of further weight reduction and desired collision energy absorption capacity of a car body structure.

The inventors have thought that, to further advance the weight reduction of a car body structure while maintaining collision safety to impacts from the rear side of the vehicle, it is useful to cause not only rear frames but also a rear floor panel, which has so far not played the role of absorbing collision energy, to absorb collision energy. However, a design idea that a rear floor panel absorbs collision energy in a principal way has not been investigated at all until now.

Thus, the present invention has been made in view of the problem mentioned above, and an object of the present invention is to provide a new and improved vehicle rear portion structure capable of achieving a weight reduction of a car body structure while maintaining collision safety to impacts from the rear side of the vehicle.

Solution to Problem

According to the present invention in order to achieve the above-mentioned object, there is provided A vehicle rear portion structure including: a pair of rear frames provided in a vehicle length direction; and a rear floor panel that has, from a rear side of a vehicle toward a front side of the vehicle, a concave section formed of a metal sheet having a tensile strength more than or equal to a tensile strength of the pair of rear frames and that is joined to the pair of rear frames.

The rear floor panel may have a pair of flat surface sections at both ends in a vehicle width direction and may be joined to the pair of rear frames via the pair of flat surface sections. The concave section may be provided between the pair of flat surface sections.

Each of the pair of flat surface sections may have a frame shape section extending in a vehicle length direction. At least parts of the frame shape sections of the pair of flat surface sections may be joined to the pair of rear frames.

A side wall of at least a part of each of the frame shape sections and a side wall of each of the pair of rear frames may be joined together via a joint section.

A side wall of at least a part of each of the frame shape sections may be provided with a first fitting groove extending in a vehicle height direction. A side wall of each of the pair of rear frames may be provided with a second fitting groove corresponding to the first fitting groove. The first fitting groove may be fitted into the second fitting groove.

A contact member in contact with both facing side walls of the frame shape section may be provided inside the frame shape section.

The concave section may be a spare tire storage section.

A high-rigidity region having a rigidity higher than a rigidity of the pair of flat surface sections may be provided in a bottom surface section of the spare tire storage section at least from one end to another end in a vehicle width direction of the bottom surface section.

A high-strength region having a tensile strength higher than a tensile strength of the pair of flat surface sections may be provided in a bottom surface section of the spare tire storage section at least from one end to another end in a vehicle width direction of the bottom surface section.

The concave section may have a plurality of gutter-like shapes extending in a vehicle length direction and juxtaposed in a vehicle width direction.

The concave section may be provided at each of both ends in a vehicle width direction of the rear floor panel. At least a part of each of the concave sections may be joined to each of the pair of rear frames provided in a vehicle length direction.

A side wall of at least a part of each of the concave sections and a side wall of each of the pair of rear frames may be joined together via a joint section.

A side wall of at least a part of each of the concave sections may be provided with a first fitting groove extending in a vehicle height direction. A side wall of each of the pair of rear frames may be provided with a second fitting groove corresponding to the first fitting groove. The first fitting groove may be fitted into the second fitting groove.

A contact member in contact with both facing side walls of the concave section may be provided inside the concave section.

In an intermediate section located between the concave sections in a vehicle width direction in the rear floor panel, a high-rigidity region having a rigidity higher than a rigidity of a portion on an outside in the vehicle width direction of the intermediate section in the rear floor panel may be provided from one end to another end in the vehicle width direction of the intermediate section.

In an intermediate section located between the concave sections in a vehicle width direction in the rear floor panel, a high-strength region having a tensile strength higher than a tensile strength of a portion on an outside in the vehicle width direction of the intermediate section in the rear floor panel may be provided from one end to another end in the vehicle width direction of the intermediate section.

A sheet thickness of the metal sheet in the high-rigidity region may be larger than a sheet thickness of the metal sheet in a portion other than the high-rigidity region in the rear floor panel.

A sheet member made of a resin may be joined to the metal sheet in the high-rigidity region.

A resin structure body including a plurality of cylindrical bodies of a same height, a top surface covering one end portion of each of the cylindrical bodies, and a base section connecting other end portions of adjacent ones of the cylindrical bodies may be joined to the metal sheet in the high-rigidity region via the top surfaces. A sheet member made of a resin or paper may be joined to the base sections of the resin structure body.

The metal sheet in the high-rigidity region may have a concave-convex shape.

The joint section may be at least one of a weld, a fastening section, an adhesion section, and a sticking joint section.

The weld may be formed in a line continuing while winding in a vehicle length direction.

The weld may be formed by laser welding and/or arc welding.

The weld may be formed by spot welding or arc spot welding.

The contact member may be formed of a resin or a metal.

The concave section may be provided from a rear end in a vehicle length direction of the rear floor panel.

A tensile strength of the concave section may be more than or equal to 980 MPa.

In a vehicle length direction, a rear end of the concave section may be located more on a rear side than rear ends of the pair of rear frames.

The rear floor panel may be a press-molded product obtained by press-molding one sheet to be processed.

The one sheet to be processed may be composed of a first metal sheet section corresponding to a part including at least the concave section and a second metal sheet section corresponding to a part included in the rear floor panel other than the part including at least the concave section. A tensile strength per unit width of the first metal sheet section may be higher than a tensile strength per unit width of the second metal sheet section. The sheet to be processed may be a tailored blank, for example. More specifically, the sheet to be processed may be a tailor welded blank (TWB) having a weld line. The sheet to be processed may also be a tailor rolled blank (TRB) in which a first metal sheet section is thicker than a second metal sheet section. The tensile strength herein refers to the product of the sheet thickness and the tensile strength of the material.

In the above configuration, when an impact load acts from the rear side of the vehicle, not the rear frames but the rear floor panel having a concave cross-sectional shape (concave section) in the direction of the impact load absorbs collision energy. The strength of the concave section of the rear floor panel is equal to or more than the strength of the rear frame, and the cross-sectional area of an end portion of the concave section where an impact load acts is larger than the cross-sectional area of the rear frames; thereby, the concave section is likely to undergo not bending deformation but buckling deformation. Thus, the rear floor panel can absorb collision energy caused by an impact load from the rear side of the vehicle in a principal way. Therefore, the burden of absorption of collision energy by the rear frames is reduced, and accordingly it become possible to reduce the wall thickness and the length of the rear frame. Thus, a weight reduction of the rear portion of the car body is achieved, and accordingly a weight reduction of the entire car body is achieved.

Advantageous Effects of Invention

As described above, according to the present invention, a weight reduction of a car body structure can be achieved while collision safety to impacts from the rear side of the vehicle is maintained.

DESCRIPTION OF EMBODIMENTS

Figure 1:
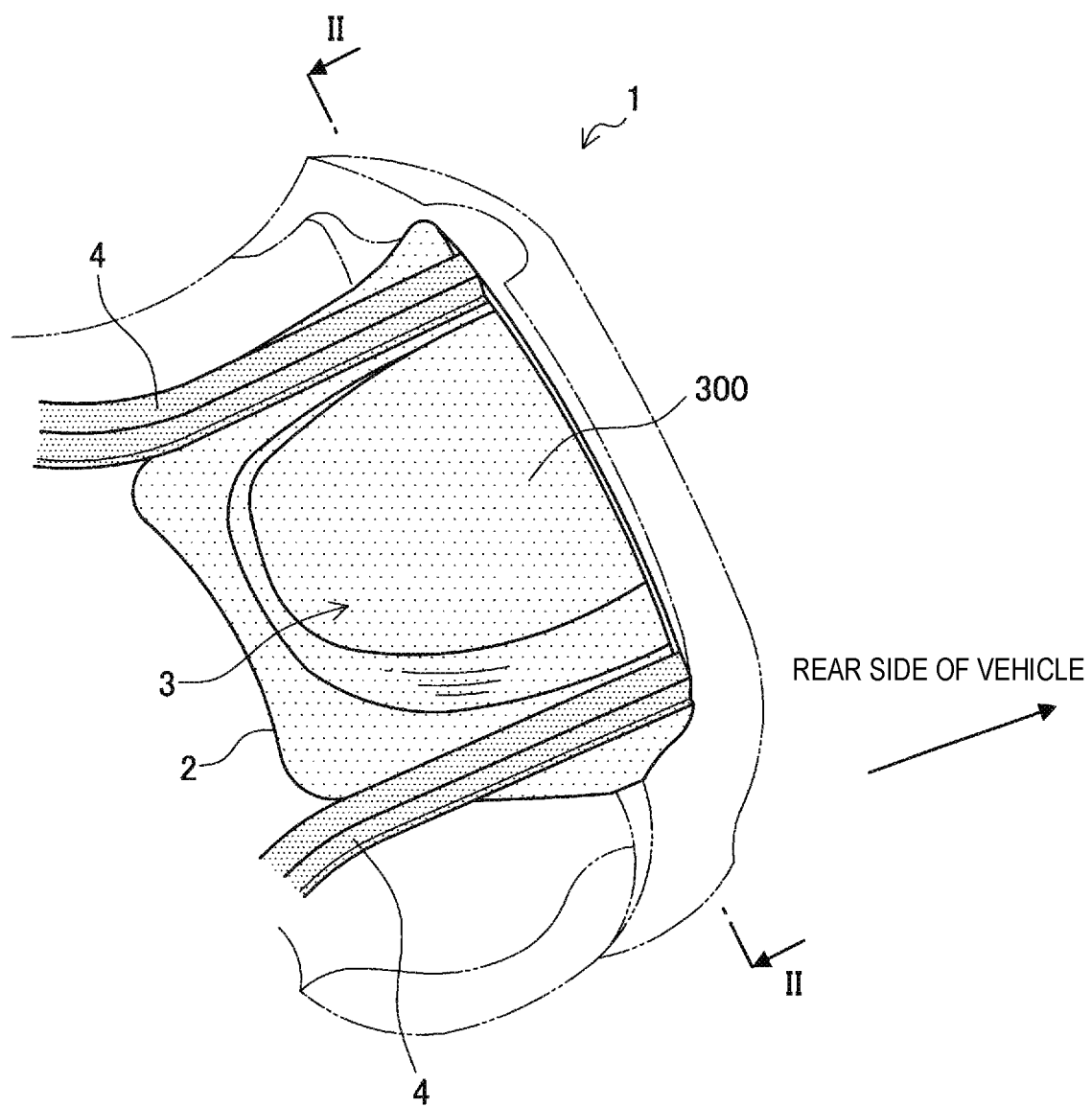
FIG. 1 is a lower perspective view showing a vehicle rear portion structure according to a first embodiment of the present invention.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

1. Background

Before describing the configuration of a vehicle rear portion structure according to each embodiment of the present invention, the background with which the present invention has been conceived is described.

Conventionally, a rear frame, which is a framework member, has a higher tensile strength than a rear floor panel, and rear frames have played the role of absorbing collision energy in regard to an impact load from the rear side of the vehicle in a principal way. However, when it is attempted to further reduce the wall thickness of a framework member such as a rear frame, the rear frame is likely to undergo not desired bending deformation but cross-sectional crushing when an impact load is acting, and hence it is highly likely that the collision energy absorption capacity of the rear frame is lower than the capacity envisaged at the time of design. Although it is possible to introduce a filler, a bulkhead, or the like in order to suppress the cross-sectional crushing of the rear frame, the weight of the vehicle is increased, and hence it is difficult to further advance the weight reduction.

On the other hand, a conventional rear floor panel has been formed of a steel sheet with a low tensile strength, such as a soft steel sheet, and hence the rear floor panel has not been supposed to play the role of absorbing collision energy.

However, on receiving an impact due to collision from the rear side of the vehicle, the rear floor panel plastically deforms together with the rear frames. Thus, the present inventors have found that, if a configuration in which a rear floor panel exhibits a large amount of plastic work and absorbs collision energy when plastically deforming at the time of collision were created, the burden of absorption of collision energy by the rear frames could be reduced.

The present inventors conducted extensive investigations, and have conceived that a rear floor panel can absorb collision energy in a principal way by increasing the strength of a concave section having a concave cross-sectional shape such as a spare tire storage section, which has conventionally been provided in a rear floor panel, thereby causing the concave section to deform at the time of collision, and utilizing the deformation. In particular, since the rear floor panel is a member that is provided as one body in the vehicle width direction, the cross-sectional area of the working end where an impact load acts is large. Hence, when an impact load acts, the rear floor panel is less likely to bend easily. Thus, the rear floor panel undergoes not bending deformation like in a rear frame but continuous buckling deformation. Such buckling deformation has a larger amount of work in plastic deformation than bending deformation, and therefore the amount of collision energy absorbed by a rear floor panel made of high-tensile steel is larger than the amount of collision energy absorbed by rear frames. That is, the rear floor panel can absorb collision energy in a principal way.

If collision energy is absorbed by the rear floor panel in a principal way, the burden of collision energy absorption of the rear frames is reduced. Thereby, the strength conventionally required of the rear frame can be reduced, and accordingly it becomes possible to further reduce the wall thickness or the length of the rear frame. From the above, the present inventors have considered that, by transferring the principal role of absorbing collision energy from the rear frames to the rear floor panel, a weight reduction of the entire car body structure could be achieved while collision safety is maintained.

The present inventors have developed a vehicle rear portion structure in which a rear floor panel can absorb collision energy in a principal way. As a result, it has been shown that a weight reduction of the entire car body structure can be achieved while collision safety is maintained. The configuration of a vehicle rear portion structure according to each embodiment of the present invention will now be described.

In the following description, terms indicating front-rear relationships such as "the front side," "the rear side," and "the rear end" refer to, unless otherwise specified, directional or positional relationships in the vehicle length direction.

2. First Embodiment

2.1. Configuration

Figure 2:
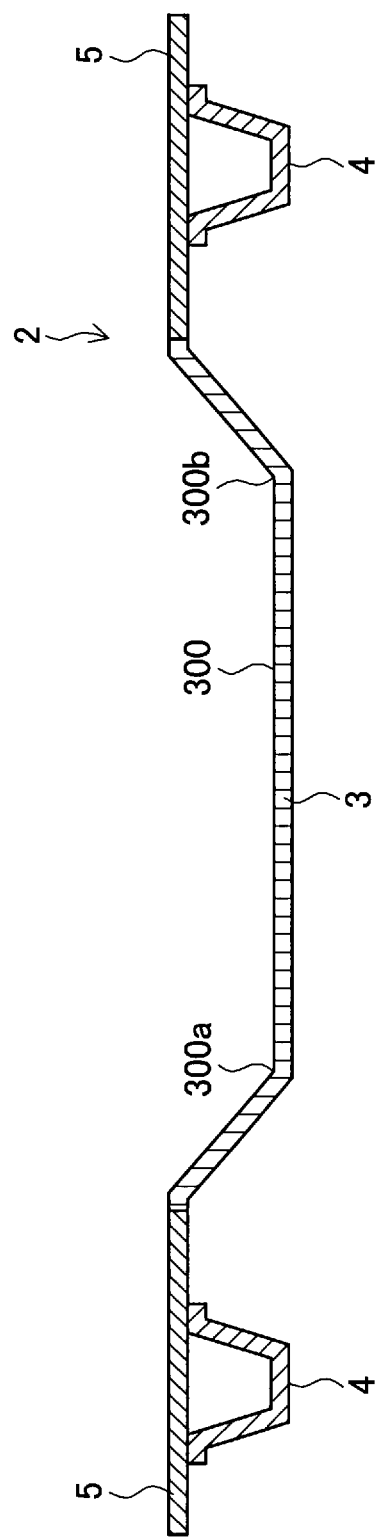
FIG. 2 is a cross-sectional view of the vehicle rear portion structure taken along a II-II cutting line of FIG. 1.

First, the configuration of a vehicle rear portion structure 1 according to a first embodiment of the present invention is described with reference to FIG. 1 and FIG. 2. FIG. 1 is a lower perspective view showing the vehicle rear portion structure 1 according to the present embodiment. FIG. 2 is a cross-sectional view of the vehicle rear portion structure 1 taken along the II-II cutting line of FIG. 1.

As shown in FIG. 1, the vehicle rear portion structure 1 according to the present embodiment includes a rear floor panel 2 and rear frames 4 and 4. The rear floor panel 2 according to the present embodiment has a spare tire storage section 3 in the center. The spare tire storage section 3 is an example of a concave section possessed by the rear floor panel 2. The spare tire storage section 3 is provided from the rear side of the rear floor panel 2 toward the front side of the vehicle. The spare tire storage section 3 is formed integrally with the rear floor panel 2. The dimensions of the spare tire storage section 3 in the vehicle length direction and the vehicle width direction are set in accordance with the dimensions of the vehicle, the dimensions of a spare tire to be loaded, etc., as appropriate.

The spare tire storage section 3 according to the present embodiment is preferably provided from the rear end of the vehicle in the rear floor panel 2. By the rear floor panel 2 having a cross-sectional shape in a cross-sectional view perpendicular to the vehicle length direction from the rear end of the vehicle, the amount of collision energy absorbed by the rear floor panel 2 can be large from the time of start of collision. Thereby, the deformation stroke toward the inside of the car due to collision can be shortened.

The rear frame 4 is a framework member provided in the vehicle length direction. Specifically, a pair of rear frames 4 are provided to extend in the vehicle length direction at the left and right of the vehicle. Such a rear frame 4 has, for example as shown in FIG. 2, a gutter-like shape in which the upper side is opened. As a steel sheet that forms the rear frame 4, a steel sheet with a tensile strength of the 590-MPa class or the 780-MPa class may be used, for example.

As shown in FIG. 2, a left and right pair of flat surface sections 5 and 5 are provided at both ends in the vehicle width direction of the rear floor panel 2. Each of the opening edge portions of the rear frames 4 is joined to the respective flat surface section 5. The method for joining the rear frame 4 and the flat surface section 5 together is not particularly limited. For example, both members are joined together by known technology such as spot welding.

The spare tire storage section 3 according to the present embodiment is provided between the pair of flat surface sections 5 and 5. The spare tire storage section 3 is formed of a steel sheet having a tensile strength higher than or equal to the tensile strength of the rear frame 4. The specific tensile strength of the steel sheet that forms the spare tire storage section 3 is set in accordance with the tensile strength of the rear frame 4 and required collision safety, as appropriate. For example, the steel sheet that forms the spare tire storage section 3 is preferably a high-tensile steel material with a tensile strength of more than or equal to 980 MPa. Further, from the viewpoint of moldability, the steel sheet that forms the spare tire storage section 3 is preferably a steel sheet with a tensile strength of less than or equal to 1780 MPa. The sheet thickness and the shape of the spare tire storage section 3 may be set in view of the balance between collision safety and the weight of the car body, as appropriate.

By this configuration, when the vehicle is struck from behind, an impact load acts on the spare tire storage section 3, and the spare tire storage section 3 undergoes buckling deformation. Thereby, the rear floor panel 2 can absorb collision energy in a principal way. Therefore, the burden of absorption of collision energy by the rear frames 4 is reduced, and accordingly it becomes possible to reduce the wall thickness or the length of the rear frame 4. As a result, a weight reduction of the car body structure can be achieved.

The rear floor panel 2 according to the present embodiment may be a press-molded product obtained by press-molding one sheet to be processed. Such a sheet to be processed may be a tailored blank composed of a first steel sheet section corresponding to the spare tire storage section 3 and a second steel sheet section corresponding to the part other than the spare tire storage section 3. Such a tailored blank may be, for example, a tailor welded blank (TWB) obtained by welding a plurality of steel sheets of different materials or sheet thicknesses before press molding, or a tailor rolled blank (TRB), which is one steel sheet having a plurality of different sheet thicknesses obtained by adjusting the pressure of cold rolling rollers. The first steel sheet section and the second steel sheet section are examples of a first metal sheet section and a second metal sheet section, respectively.

Figure 3:
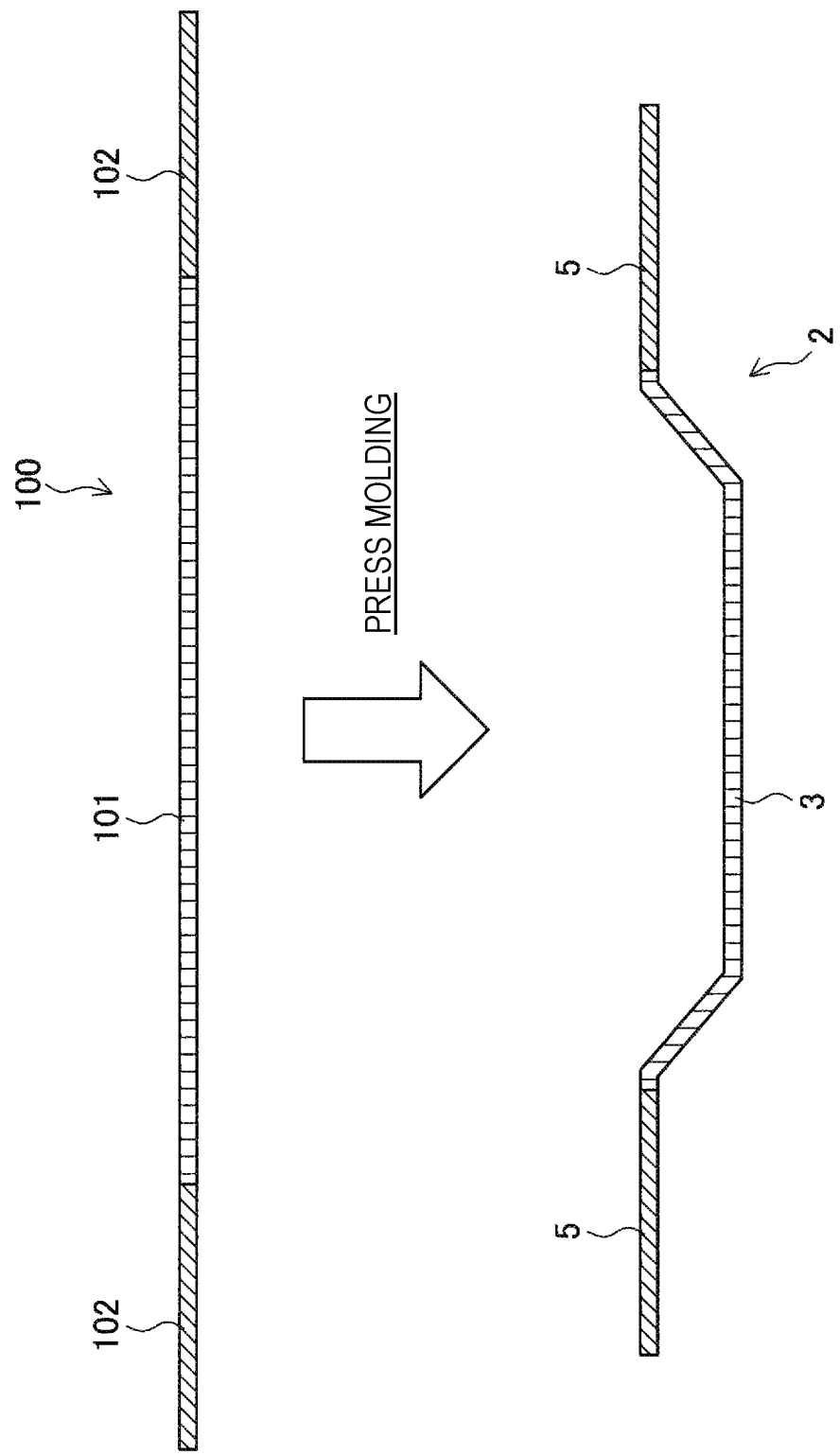
FIG. 3 is an overview diagram (schematic cross-sectional views) showing a configuration of a sheet to be processed and a configuration of a rear floor panel obtained by press-molding the sheet to be processed.

FIG. 3 is an overview diagram (schematic cross-sectional views) showing the configuration of a sheet to be processed 100 and the configuration of the rear floor panel 2 obtained by press-molding the sheet to be processed 100. As shown in FIG. 3, the sheet to be processed 100 is composed of a first steel sheet section 101 and a second steel sheet section 102. The rear floor panel 2 is obtained by press-molding the sheet to be processed 100. Here, the first steel sheet section 101 corresponds to a part including the spare tire storage section 3 after press molding, and the second steel sheet section 102 corresponds to a part of the rear floor panel 2 other than the part including the spare tire storage section 3 after press molding. For example, the second steel sheet section 102 corresponds to the flat surface sections 5 of the rear floor panel 2, and the first steel sheet section 101 corresponds to a part of the rear floor panel 2 including the spare tire storage section 3. Since the first steel sheet section 101 corresponds to the spare tire storage section 3, which is an example of the concave section, it is required that the tensile strength of the first steel sheet section 101 be larger than the tensile strength of the rear frame 4. On the other hand, the second steel sheet section 102 does not play the role of absorbing collision energy in a principal way when an impact load is acting. Hence, the tensile strength of the second steel sheet section 102 is not particularly limited. The tensile strength herein refers to the product of the sheet thickness and the tensile strength of the material.

From this, in a sheet to be processed 100 that is a tailored blank, it is preferable that the tensile strength per unit width of the first steel sheet section 101 be larger than the tensile strength per unit width of the second steel sheet section 102. Thereby, a rear floor panel 2 in which only the spare tire storage section 3 has a high tensile strength can be produced. Thus, the molding process of the rear floor panel 2 can be made more efficient from the viewpoints of moldability and cost.

Although in the present embodiment the tensile strength of the spare tire storage section 3 is set higher than the tensile strength of the rear frame 4, a part of the rear floor panel 2 other than the spare tire storage section 3 may be formed of a steel sheet having the same tensile strength as the spare tire storage section 3, for example. More specifically, the entire rear floor panel 2 may be formed of one steel sheet having a tensile strength higher than the tensile strength of the rear frame 4. The type of the steel sheet that forms a part of the rear floor panel 2 other than the spare tire storage section 3 is not particularly limited as long as at least the tensile strength of the spare tire storage section 3 of the rear floor panel 2 is higher than or equal to the tensile strength of the rear frame 4.

In a bottom surface section 300 of the spare tire storage section 3, a region (high-strength region) having a tensile strength higher than the tensile strength of a portion (for example, the flat surface section 5) on the outside of the bottom surface section 300 may be provided. The high-strength region may be provided at least from one end 300a to the other end 300b in the vehicle width direction of the bottom surface section 300. The high-strength region may be provided in the whole or part of the bottom surface section 300. By increasing the tensile strength of the bottom surface section 300, even when an object collides against a portion of the rear floor panel 2 between the pair of rear frames 4 from the rear side of the vehicle, the bottom surface section 300 can prevent the entry of the object toward the inside of the car.

Furthermore, by increasing the tensile strength of the bottom surface section 300 in the case where, as described later, a high-rigidity region is provided in the bottom surface section 300, the range allowing elastic deformation, in which the rigidity of the bottom surface section 300 can be maintained, can be expanded. Thereby, the rear frames 4 are less likely to twist relatively, and therefore collision safety can be further enhanced.

The rear floor panel 2 including the bottom surface section 300 of the spare tire storage section 3 having the high-strength region is obtained by, for example, press-processing a tailored blank including a steel sheet section in which the tensile strength of the portion corresponding to the bottom surface section 300 is set relatively high.

Although the cross-sectional shape of the spare tire storage section 3 shown in FIG. 2 is a saucer-like shape, the cross-sectional shape may be a V-like shape, a U-like shape, or the like, for example. The cross-sectional shape of the spare tire storage section 3 is not particularly limited as long as it is a shape that satisfies required collision safety and can achieve a weight reduction. Further, although the spare tire storage section 3 shown in FIG. 2 is an example of the concave section, the concave section may not necessarily be a spare tire storage section. For example, the concave section may be a trunk space provided in order to store baggage etc., or may be, as described later, a gutter-like section formed in order to ensure collision safety.

Although the cross-sectional shape of the bottom surface section 300 of the spare tire storage section 3 shown in FIG. 2 is a horizontal straight line, the shape of the bottom surface section 300 of the spare tire storage section 3 is not particularly limited. For example, the cross-sectional shape of the bottom surface section 300 of the spare tire storage section 3 may be a curved line. The bottom surface section 300 of the spare tire storage section 3 may further include at least one concave-convex shape.

In the bottom surface section 300 of the spare tire storage section 3, a region (high-rigidity region) having a rigidity higher than the rigidity of a portion (for example, the flat surface section 5) on the outside of the bottom surface section 300 may be provided. The high-rigidity region may be provided at least from one end 300a to the other end 300b in the vehicle width direction of the bottom surface section 300. As described later, the high-rigidity region may be provided in the whole or part of the bottom surface section 300.

By providing the high-rigidity region in the bottom surface section 300 from one end 300a to the other end 300b in the vehicle width direction of the bottom surface section 300, the bottom surface section 300 occupying the area of a large part of the rear floor panel 2 is less likely to twist. In this case, even when an impact load acts on the rear side of the vehicle, the rear floor panel 2 is less likely to twist, and accordingly also the pair of rear frames 4 are less likely to twist relatively. Consequently, the rear frame 4 is restrained to the rear floor panel 2 more reliably. Thereby, the deformation mode of the rear frame 4 is stabilized, and therefore the collision safety of the vehicle rear portion structure 1 can be caused to be exhibited as much as possible.

Furthermore, by providing the high-rigidity region in the bottom surface section 300, the sound reduction index can be reduced. Thereby, the bottom surface section 300 blocks noise such as road noise and vibration, and therefore noise and vibration can be hindered from being transmitted to the interior of the vehicle. Thus, the comfortableness of the interior of the vehicle can be improved.

Specific means for increasing the rigidity in the high-rigidity region of the bottom surface section 300 will be described later.

The depth of the concave section 3 (the spare tire storage section 3) of the vehicle rear portion structure according to the present embodiment is preferably more than or equal to 50 mm. This is because, if the depth of the concave section is smaller than 50 mm, a sufficient amount of impact energy absorbed by means of the cross-sectional shape of the concave section is not obtained. The prescription of the depth of the concave section 3 similarly applies to the following embodiments and other embodiments according to the present invention. Here, the depth of the concave section 3 is the length from the flat surface section 5 to the bottom surface section 300 of the concave section 3 in the vertical direction.

2.2. First Modification Example (Shortening)

Figure 4:
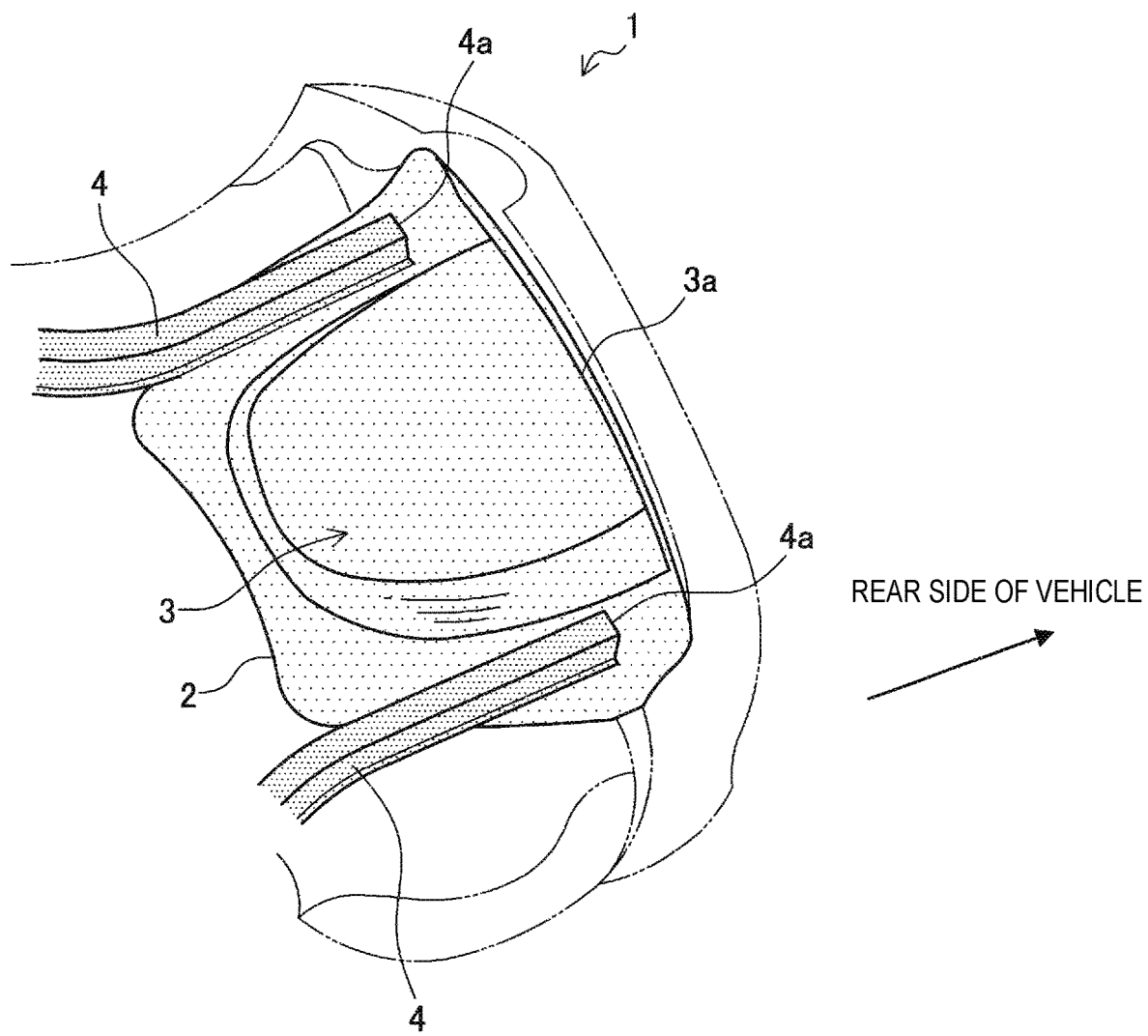
FIG. 4 is a lower perspective view showing a vehicle rear portion structure in which rear frames according to the embodiment are shortened.

Next, a first modification example of the vehicle rear portion structure 1 according to the present embodiment is described. In the present modification example, a vehicle rear portion structure 1 including shortened rear frames 4 is described. FIG. 4 is a lower perspective view showing a vehicle rear portion structure 1 in which the rear frames 4 are shortened. As shown in FIG. 4, the rear frame 4 provided in the vehicle length direction is provided such that the rear end 4a of the rear frame 4 is located more on the front side of the vehicle than the rear end 3a of the spare tire storage section 3 of the rear floor panel 2. That is, the length of the rear frame 4 shown in FIG. 4 is shorter than the length of the rear frame 4 shown in FIG. 1 (in FIG. 1, the rear end of the rear frame 4 and the rear end of the spare tire storage section 3 are at the same position in the vehicle length direction). When a vehicle including a vehicle rear portion structure 1 having such a configuration is struck from behind, an impact load acts on the rear end of the spare tire storage section 3, and the spare tire storage section 3 undergoes buckling deformation; thereby, the rear floor panel 2 absorbs collision energy. Therefore, even when the rear frames 4 are provided more on the front side than the rear end of the spare tire storage section 3, the rear floor panel 2 absorbs collision energy; hence, the collision safety of the vehicle is ensured. Thus, the weight of the car body structure can be reduced by an amount equivalent to the shortening of the rear frames 4.

The shortening of the rear frame 4 is preferably made to the extent that the rear frame 4 can be joined to the rear floor panel 2 and the buckling deformation of the rear floor panel 2 does not reach the passenger room region. The rear floor panel 2 is generally provided to traverse the passenger room region and a trunk region (a region where the spare tire storage section 3 is provided). If the buckling deformation of the rear floor panel 2 reaches the passenger room region, the passenger in the passenger room region may be endangered. Hence, the rear frame 4 preferably has such a length that the rear frame 4 traverses at least the passenger room region from the front side to the rear side of the vehicle and is provided such that the rear end of the rear frame 4 is located on the trunk region side. More specifically, the rear frame 4 is preferably provided such that the rear end 4a of the rear frame 4 is located more on the rear side of the vehicle than a wheelhouse section or a rear suspension member (not illustrated). Thereby, when an impact load acts on the rear end of the rear floor panel 2, the progress of buckling deformation of the rear floor panel 2 is suppressed by the suspension member and the rear frames 4, and therefore the influence of impact on the passenger room region can be reduced.

2.3. Second Modification Example (Gutter-Like Shape)

Figure 5:
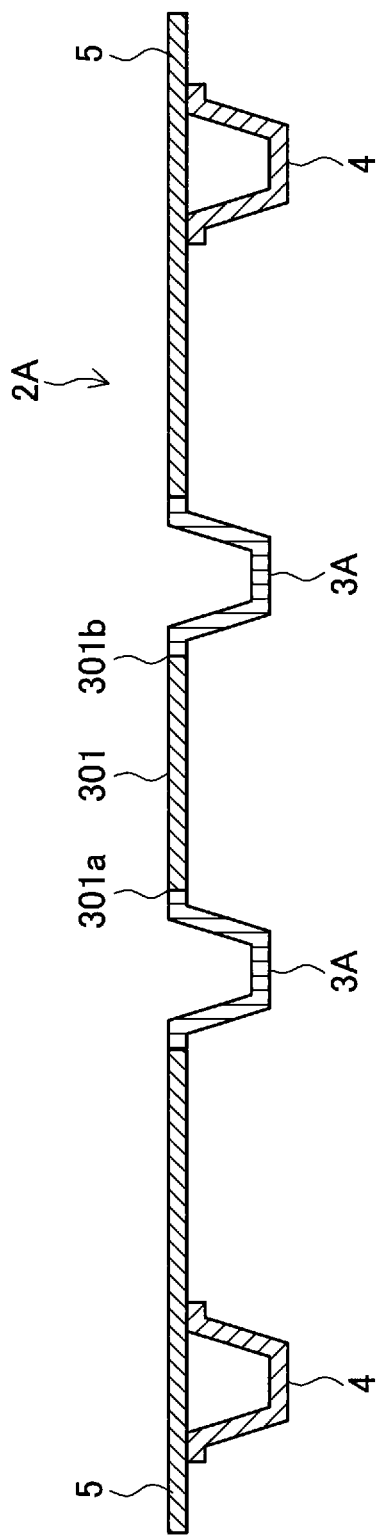
FIG. 5 is a cross-sectional view related to a modification example of the vehicle rear portion structure according to the embodiment.

Next, a second modification example of the vehicle rear portion structure 1 according to the present embodiment is described. In the present modification example, a vehicle rear portion structure 1 that includes, in place of the spare tire storage section 3, concave sections 3A having a cross section of a plurality of gutter-like shapes is described. FIG. 5 is a cross-sectional view related to a modification example of the vehicle rear portion structure 1 according to the present embodiment. The cross-sectional view shown in FIG. 5 is a cross-sectional view taken along a cutting line corresponding to a position corresponding to the II-II cutting line included in the lower perspective view of the vehicle rear portion structure 1 shown in FIG. 1. As shown in FIG. 5, in the rear floor panel 2, two concave sections 3A and 3A having a cross section of gutter-like shapes and extending in the vehicle length direction are juxtaposed in the vehicle width direction between the pair of flat surface sections 5 and 5, in place of the spare tire storage section 3. The two concave sections 3A and 3A are formed integrally with the rear floor panel 2. In this case, a plurality of concave sections 3A with a cross section of gutter-like shapes like those shown in FIG. 5 are provided from the rear end of the rear floor panel 2 to the front side of the vehicle in order to increase the working cross-sectional area of the rear floor panel 2 on which an impact load from the rear side of the vehicle acts. Thereby, even in a car body structure not having a spare tire storage section, an impact load from the rear side of the vehicle acts on the rear ends of the concave sections 3A, and the concave sections 3A absorb collision energy in a principal way. Thus, the burden of absorption of collision energy by the rear frames 4 is reduced, and accordingly it becomes possible to reduce the wall thickness and the length of the rear frame 4.

Although in the example shown in FIG. 5 the concave section 3A has a gutter-like shape in which the upper side is opened, the present invention is not limited to the example. For example, the shape of the concave section 3A may have a gutter-like shape in which the lower side is opened. Further, the cross-sectional shape of the concave section 3A is not particularly limited as long as it is a shape capable of increasing the geometrical moment of inertia in the vehicle length direction of the concave section 3A. The length in the vehicle length direction and the width in the vehicle width direction of the concave section 3A may be adjusted from the viewpoints of collision safety, moldability, etc., as appropriate.

In the vehicle rear portion structure 1, for example, a not-illustrated steel sheet may be provided on at least one of the concave sections 3A shown in FIG. 5 so as to cover the concave section 3A, and a closed cross-sectional structure may be formed by the concave section 3A and the steel sheet. The steel sheet may be formed of the same material as the concave section 3A. Such a closed cross-sectional structure may be, for example, a rectangular cross-sectional structure or a quadrangular cross-sectional structure. By using the steel sheet to form a closed cross-sectional structure including the concave section 3A, the amount of collision energy absorbed can be further increased. Also in the case where only one concave section 3A shown in FIG. 5 is provided in the rear floor panel 2, a closed cross-sectional structure may be formed by the concave section 3A and a not-illustrated steel sheet.

In an intermediate section 301 located between the two concave sections 3A and 3A shown in FIG. 5, a region (high-rigidity region) having a rigidity higher than the rigidity of a portion (for example, the flat surface section 5) on the outside of the intermediate section 301 may be provided. The high-rigidity region may be provided at least from one end 301a to the other end 301b in the vehicle width direction of the intermediate section 301. As described later, the high-rigidity region may be provided in the whole or part of the intermediate section 301.

By providing the high-rigidity region in the intermediate section 301 from one end 301a to the other end 301b in the vehicle width direction of the intermediate section 301, similarly also the pair of rear frames 4 are less likely to twist relatively. Consequently, the rear frame 4 is restrained to the rear floor panel 2 more reliably. Thereby, the deformation mode of the rear frame 4 is stabilized, and therefore the collision safety of the vehicle rear portion structure 1 can be caused to be exhibited as much as possible.

Furthermore, by providing the high-rigidity region in the intermediate section 301, the sound reduction index can be reduced. Thereby, the intermediate section 301 blocks noise such as road noise and vibration, and therefore noise and vibration can be hindered from being transmitted to the interior of the vehicle. Thus, the comfortableness of the interior of the vehicle can be improved.

Specific means for increasing the rigidity in the high-rigidity region of the intermediate section 301 will be described later.

In the intermediate section 301, a region (high-strength region) having a tensile strength higher than the tensile strength of a portion (for example, the flat surface section 5) on the outside of the intermediate section 301 may be provided. The high-strength region may be provided at least from one end 301a to the other end 301b in the vehicle width direction of the intermediate section 301. The high-strength region may be provided in the whole or part of the intermediate section 301. By increasing the tensile strength of the intermediate section 301, even when an object collides against a portion of the rear floor panel 2 between the pair of rear frames 4 from the rear side of the vehicle, the intermediate section 301 can prevent the entry of the object toward the inside of the car.

Furthermore, when the rigidity of the intermediate section 301 is increased, the range allowing elastic deformation, in which the rigidity of the intermediate section 301 can be maintained, can be expanded. Thereby, the pair of rear frames 4 are less likely to twist relatively, and therefore collision safety can be further enhanced.

The rear floor panel 2 including the intermediate section 301 having the high-strength region is obtained by, for example, press-processing a tailored blank including a steel sheet section in which the tensile strength of the portion corresponding to the intermediate section 301 is set relatively high.

3. Second Embodiment

Figure 6:
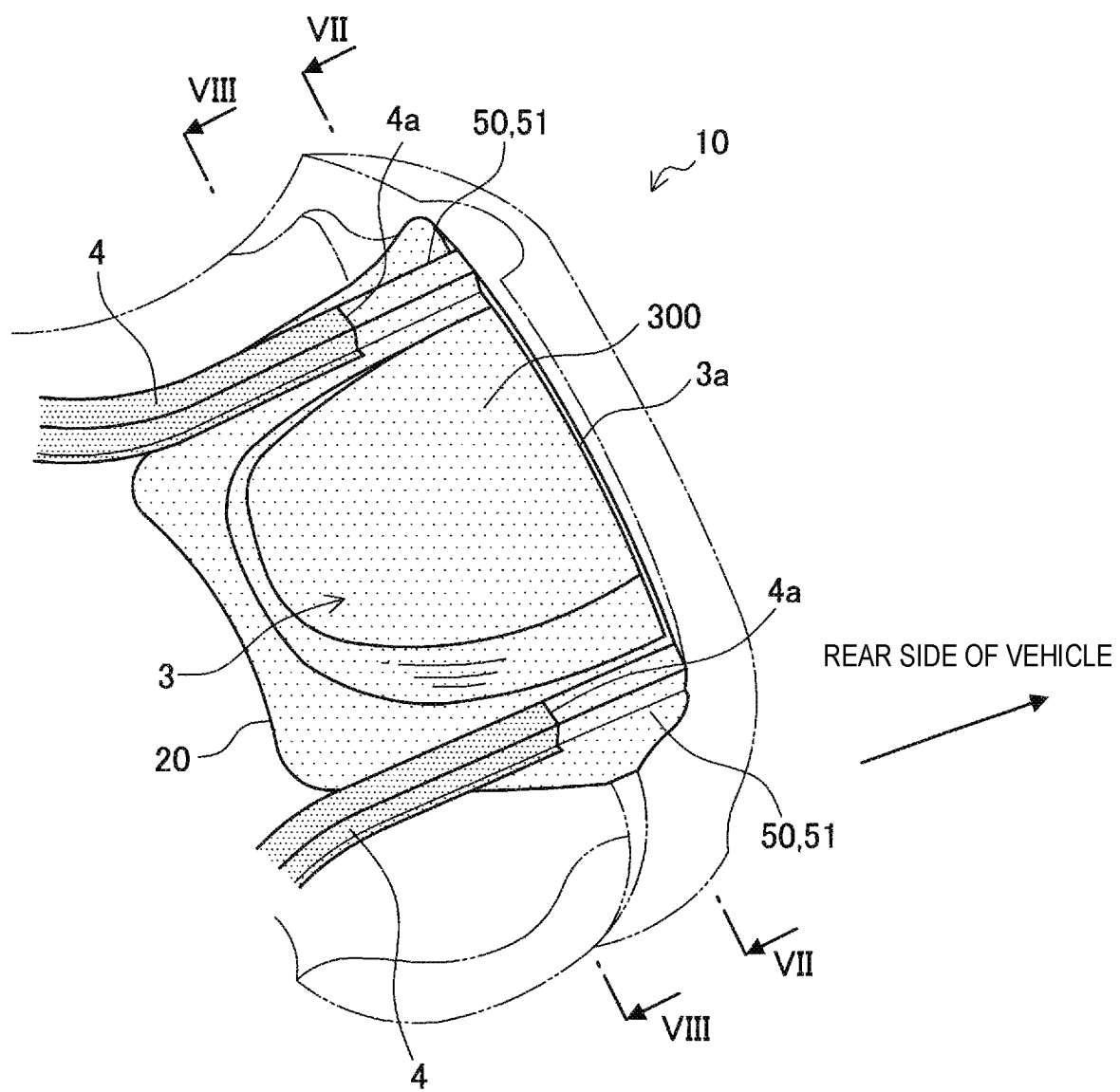
FIG. 6 is a lower perspective view showing a vehicle rear portion structure according to a second embodiment of the present invention.
Figure 7:
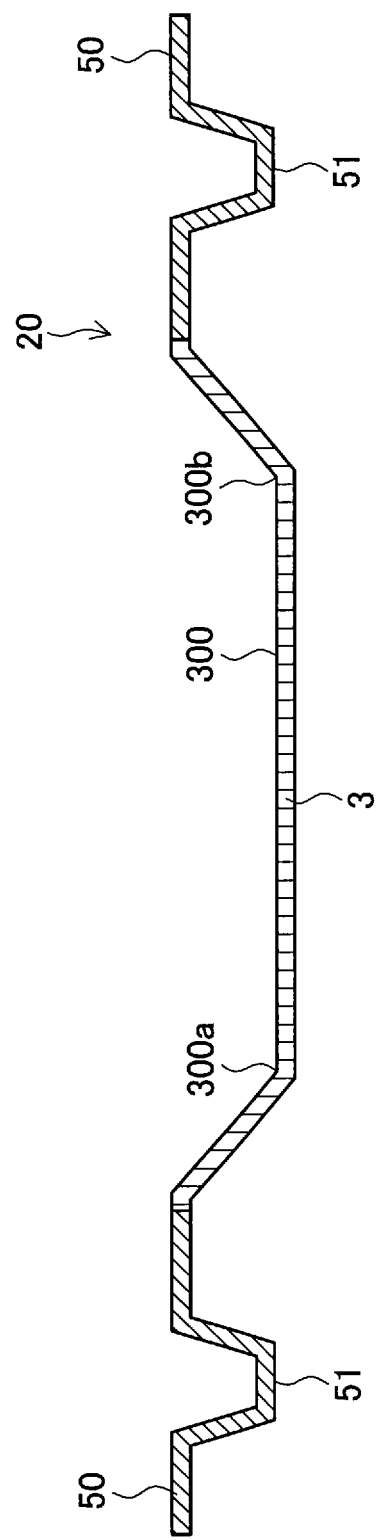
FIG. 7 is a cross-sectional view of the vehicle rear portion structure taken along a VII-VII cutting line of FIG. 6.
Figure 8:
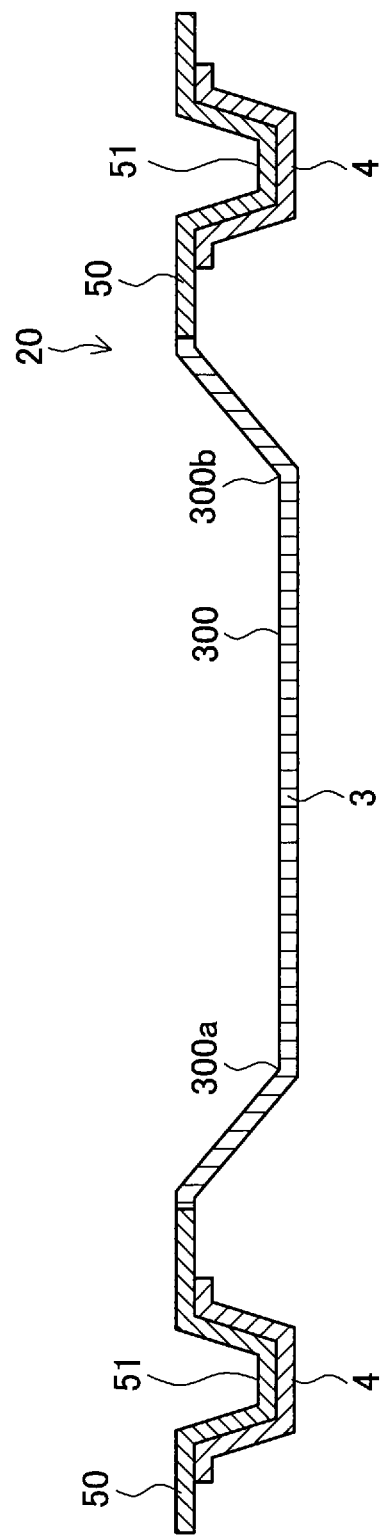
FIG. 8 is a cross-sectional view of the vehicle rear portion structure taken along an VIII-VIII cutting line of FIG. 6.

Next, the configuration of a vehicle rear portion structure 10 according to a second embodiment of the present invention is described. FIG. 6 is a lower perspective view showing the vehicle rear portion structure 10 according to the present embodiment. FIG. 7 is a cross-sectional view of the vehicle rear portion structure 10 taken along the VII-VII cutting line of FIG. 6. FIG. 8 is a cross-sectional view of the vehicle rear portion structure 10 taken along the VIII-VIII cutting line of FIG. 6.

As shown in FIG. 6, the vehicle rear portion structure 10 according to the present embodiment includes a rear floor panel 20 and the rear frames 4 and 4. As shown in FIG. 7, the rear floor panel 20 has the spare tire storage section 3 in the center. The spare tire storage section 3 is an example of the concave section possessed by the rear floor panel 20. The spare tire storage section 3 is formed integrally with the rear floor panel 20. The spare tire storage section 3 is provided from the rear end of the vehicle rear portion structure 10 toward the front side of the vehicle.

The rear frame 4 according to the present embodiment is a member that is formed of a steel sheet having the same tensile strength as the rear frame 4 included in the vehicle rear portion structure 10 according to the first embodiment and has a gutter-like shape in which the upper side is opened. The rear frame 4 according to the present embodiment may be, as shown in FIG. 6, a rear frame having such a length that the rear end 4a of the rear frame 4 is located more on the front side than the rear end 3a of the spare tire storage section 3. The rear frame 4 may also be a rear frame having such a length that the rear end 4a of the rear frame 4 is at the same position as the rear end of the spare tire storage section 3 in the vehicle length direction.

The steel sheet that forms the spare tire storage section 3 is, like in the first embodiment of the present invention, a steel sheet having a tensile strength higher than or equal to the tensile strength of the rear frame 4. Specifically, the tensile strength of the steel sheet that forms the spare tire storage section 3 is preferably more than or equal to 980 MPa.

As shown in FIG. 7, a left and right pair of flat surface sections 50 and 50 are provided at both ends in the vehicle width direction of the rear floor panel 20. A frame shape section 51 having a gutter-like shape in which the upper side is opened and that extends in the vehicle length direction is provided in each of the flat surface sections 50. A part of the frame shape section 51 is joined to the rear frame 4. For example, as shown in FIG. 6 and FIG. 8, the outer side surfaces of the frame shape section 51 are joined to the inner side surfaces of the rear frame 4. Thereby, a part of an impact load that has acted on the rear floor panel 20 is transferred to the rear frame 4 via the frame shape section 51.

By this configuration, the frame shape section 51 of the rear floor panel 20 and the rear frame 4 are joined together in a shear joint shape at side surfaces and bottom surfaces of a hat shape. Consequently, the peeling stress in the joint section between the frame shape section 51 and the rear frame 4 is reduced, and peeling, which is a problem in the case of joining ultra-high-strength steel sheets, is suppressed; thus, the contact area between the rear floor and the frame section can be increased. As a result, the joint area can be increased. Thereby, even when the length in the vehicle length direction of the rear frame 4 is shortened, the likelihood that the joint section between the rear frame 4 and the rear floor panel 20 will peel off due to an impact load can be reduced. Therefore, when the rear floor panel 20 that absorbs collision energy is undergoing buckling deformation, the direction of buckling deformation can be restrained more reliably. Thus, the capacity of collision energy absorption by the rear floor panel 20 can be maintained.

In the case where the frame shape section 51 and the rear frame 4 are joined together, it is preferable that side walls (the outer side surfaces) of the frame shape section 51 and side walls (the inner side surfaces) of the rear frame 4 be joined together via joint sections. The joint section refers to a portion where the side surface of the frame shape section 51 and the side surface of the rear frame 4 are joined together by welding, fastening, etc.

When an impact load acts on the rear floor panel 20 in a principal way, the rear floor panel 20 exhibits a deformation mode like moving away from the rear frames 4. Consequently, force (shear force) of being drawn in in-plane directions of the joint surfaces of both side walls constituting the joint section is generated between the rear floor panel 20 and the rear frame 4. Then, like in what is called a shear breaking mode, a behavior like one in which the joint surfaces shift in in-plane directions occurs in the joint section.

Here, a case where it is assumed that only a bottom surface of the frame shape section 51 and a bottom surface of the rear frame 4 are joined together is envisaged. In this case, when an impact load acts on the rear floor panel 20 in a principal way, force of being drawn in out-of-plane directions of the joint surfaces of both bottom surfaces constituting the joint section is generated between the rear floor panel 20 and the rear frame 4. Then, like in what is called a plug breaking mode, a behavior like one in which the joint surfaces peel off occurs in the joint section.

In general, the tensile shear strength (TSS) of one joint section tends to be higher than the cross tensile strength (CTS) of the joint section. That is, the tensile strength in the shear directions of the joint surfaces related to the shear breaking mode is superior to the tensile strength in the peeling directions of the joint surfaces related to the plug breaking mode. Herein, the side wall of the frame shape section 51 and the side wall of the rear frame 4 are joined together, and thereby a behavior of the shear breaking mode can be caused to occur in the joint section. That is, when an impact load acts on the rear floor panel 20, a behavior of not the plug breaking mode but the shear breaking mode is exhibited, and hence the joint strength of the joint section is practically increased. Therefore, the breaking of the joint section can be hindered. Thus, peeling between the rear floor panel 20 and the rear frame 4 is less likely to occur.

In this case, when an impact load acts on the rear floor panel 20 from the rear side of the vehicle, the joint strength of the joint section can be increased. That is, the breaking of the joint section can be hindered. Consequently, even when a high impact load acts on the rear floor panel 20, the breaking of the joint section does not occur, and the rear frames 4 sufficiently support the rear floor panel 20 via the joint sections. Thereby, the rear floor panel 20 that has received an impact load does not bend to the inside of the vehicle, but catches the impact load and plastically deforms.

Thereby, the rear floor panel 20 can absorb collision energy. Therefore, the transfer of impact force to the inside of the vehicle and the entry of a colliding body or the like can be prevented. Thus, the collision safety of the car body can be enhanced.

It has been revealed that, as the steel sheet becomes stronger and lighter in weight, the shear breaking mode becomes more superior in tensile strength to the plug breaking mode. In particular, it has been revealed that, for a steel sheet with a tensile strength of more than or equal to 780 MPa, the difference in tensile strength between the two breaking modes described above is significantly large. That is, by increasing the strength and reducing the weight of the steel sheet that forms the rear floor panel 20, the joint strength of the joint section according to the present embodiment is further increased, and hence joint breaking can be hindered. Thus, collision safety exhibited by the vehicle rear portion structure 1 according to the present embodiment is further enhanced by the steel sheet that forms the rear floor panel 20 being increased in strength and reduced in weight.

Specific means for obtaining the joint section will be described later.

As described in the first embodiment, a region (high-rigidity region) having a rigidity higher than the rigidity of a portion (for example, the flat surface section 5) on the outside of the bottom surface section 300 may be provided in the bottom surface section 300 of the spare tire storage section 3. The high-rigidity region may be provided at least from one end 300*a* to the other end 300*b* in the vehicle width direction of the bottom surface section 300. As described later, the high-rigidity region may be provided in the whole or part of the bottom surface section 300.

Further, as described in the first embodiment, a region (high-strength region) having a tensile strength higher than the tensile strength of a portion (for example, the flat surface section 5) on the outside of the bottom surface section 300 may be provided in the bottom surface section 300. The high-strength region may be provided at least from one end 300*a* to the other end 300*b* in the vehicle width direction of the bottom surface section 300. The high-strength region may be provided in the whole or part of the bottom surface section 300.

The frame shape section 51 shown in FIG. 6 etc. may not necessarily be provided wholly from the rear end to the front end of the flat surface section 50. For example, the frame shape section 51 may be provided partly from an intermediate portion to the front end of the flat surface section 50 in the vehicle length direction.

Figure 9:
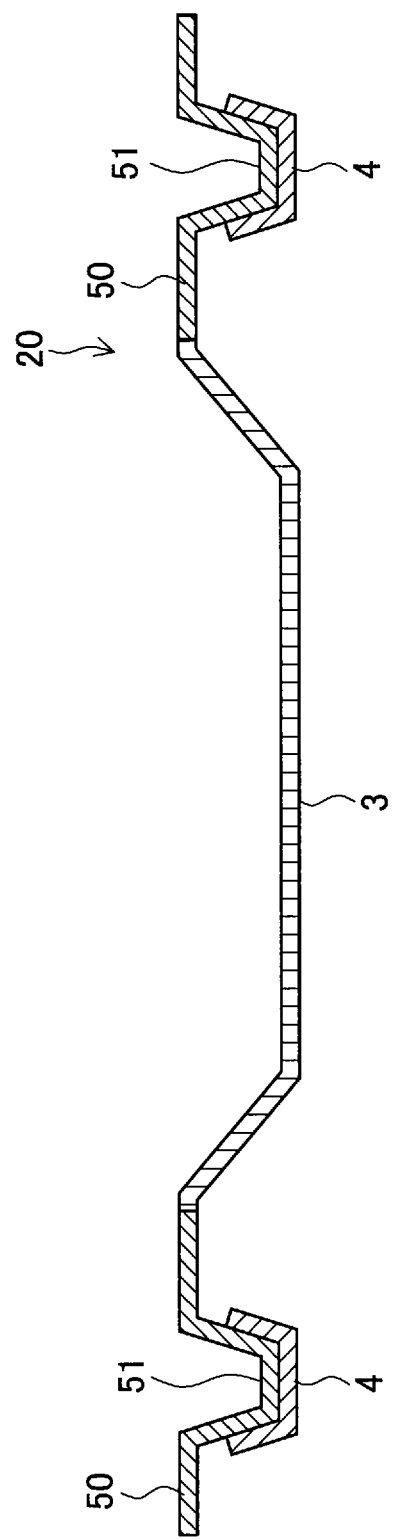
FIG. 9 is a cross-sectional view related to another example of the vehicle rear portion structure taken along the VIII-VIII cutting line of FIG. 6.

The rear frame 4 shown in FIG. 6 and FIG. 8 may not be provided with a flange. FIG. 9 is a cross-sectional view related to another example of the vehicle rear portion structure taken along the VIII-VIII cutting line of FIG. 6. The presence or absence of a flange in the rear frame 4 is not particularly limited as long as, as shown in FIG. 9, a rear frame 4 having no flange and the frame shape section 51 of the rear floor panel 20 are joined together by each other's side surfaces and/or bottom surfaces.

Figure 10:
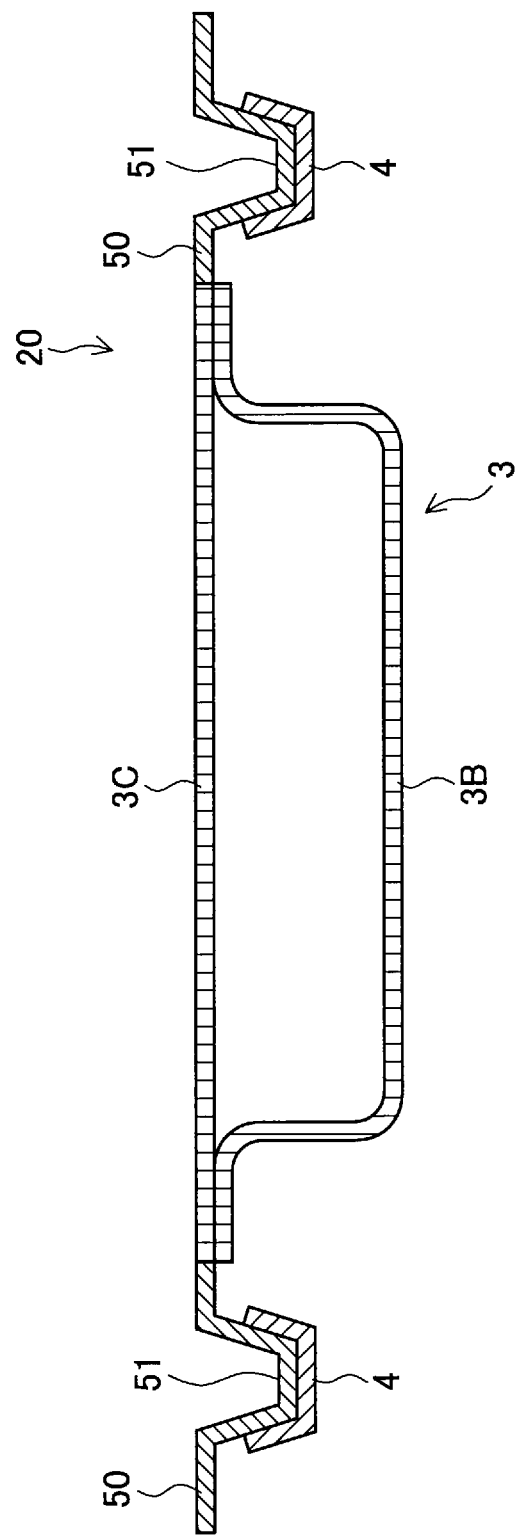
FIG. 10 is a cross-sectional view related to a modification example of the vehicle rear portion structure according to the embodiment.

The rear floor panel 20 according to the present embodiment may have a closed cross-sectional structure formed of a concave section and a portion covering the concave section. FIG. 10 is a cross-sectional view related to a modification example of the vehicle rear portion structure 10 according to the present embodiment. As shown in FIG. 10, in the rear floor panel 20 according to the present modification example, a closed cross-sectional section 3 composed of a hat shape section 3B and a flat sheet section 3C is provided in the center of the rear floor panel 20. The amount of impact energy absorbed can be further increased by the closed cross-sectional structure shown in FIG. 10. Although in the example shown in FIG. 10 the flat sheet section 3C is provided continuously with the flat surface section 50, it is also possible for the hat shape section 3B to be provided continuously with the flat surface section 50.

4. Third Embodiment

Figure 11:
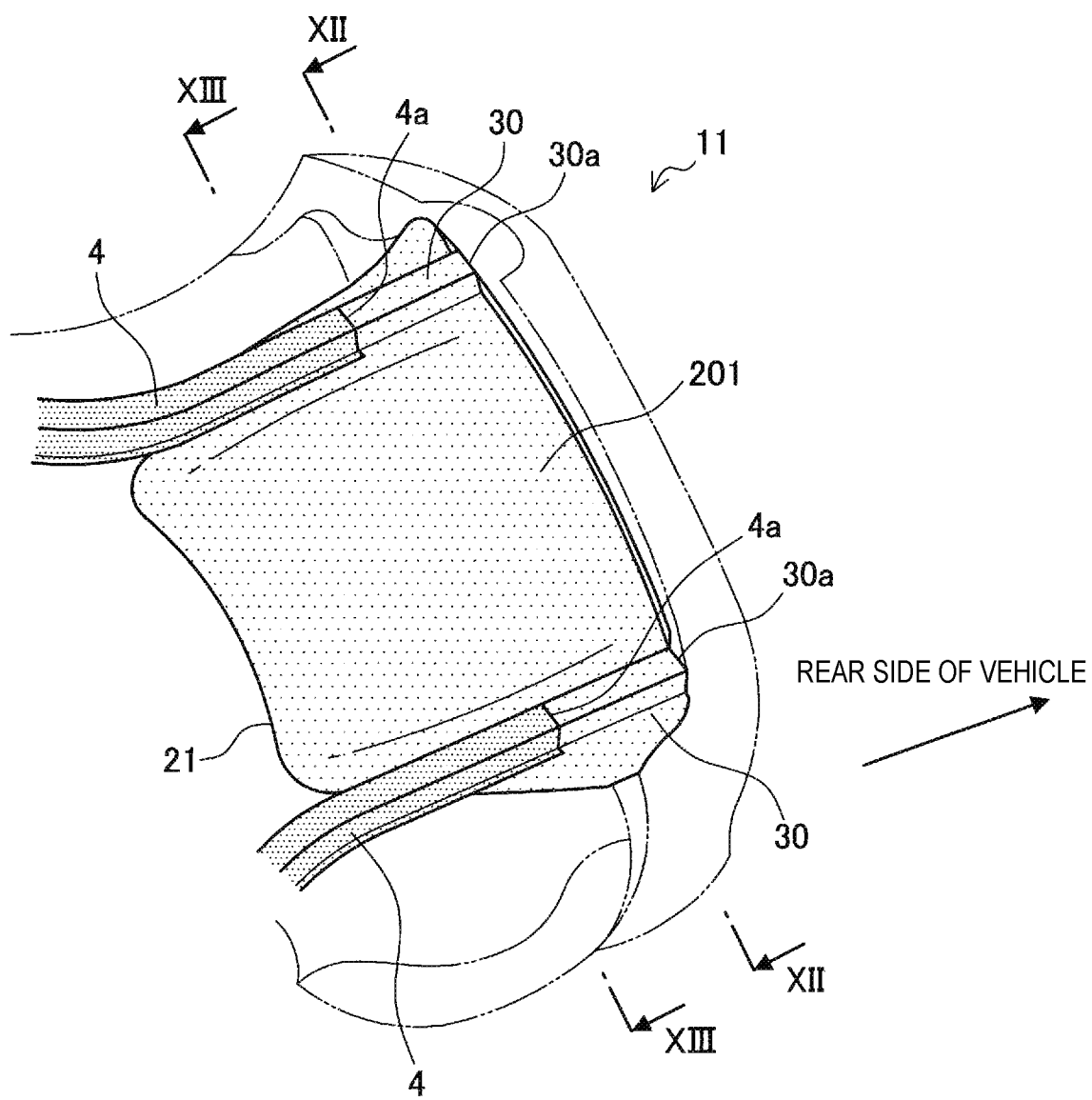
FIG. 11 is a lower perspective view showing a vehicle rear portion structure according to a third embodiment of the present invention.
Figure 12:
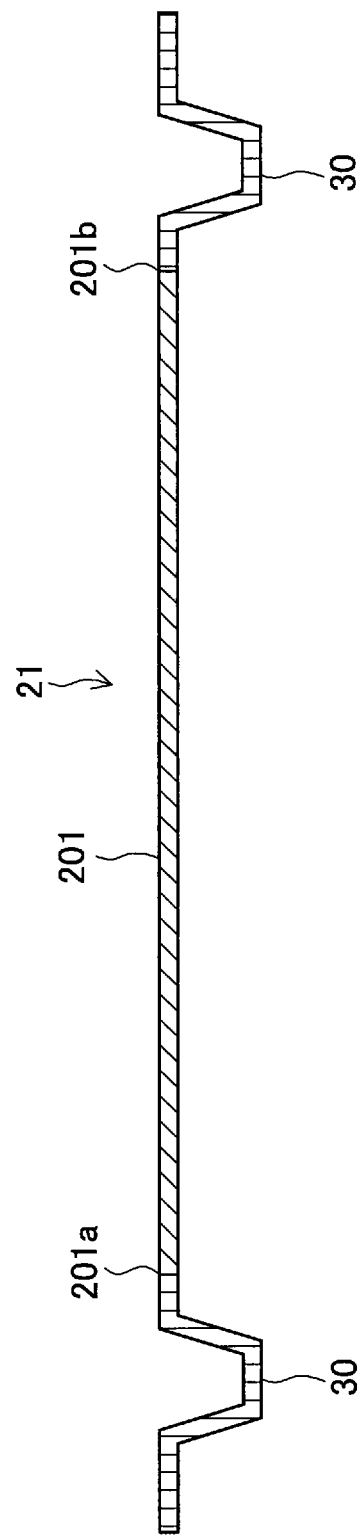
FIG. 12 is a cross-sectional view of the vehicle rear portion structure taken along a XII-XII cutting line of FIG. 11.
Figure 13:
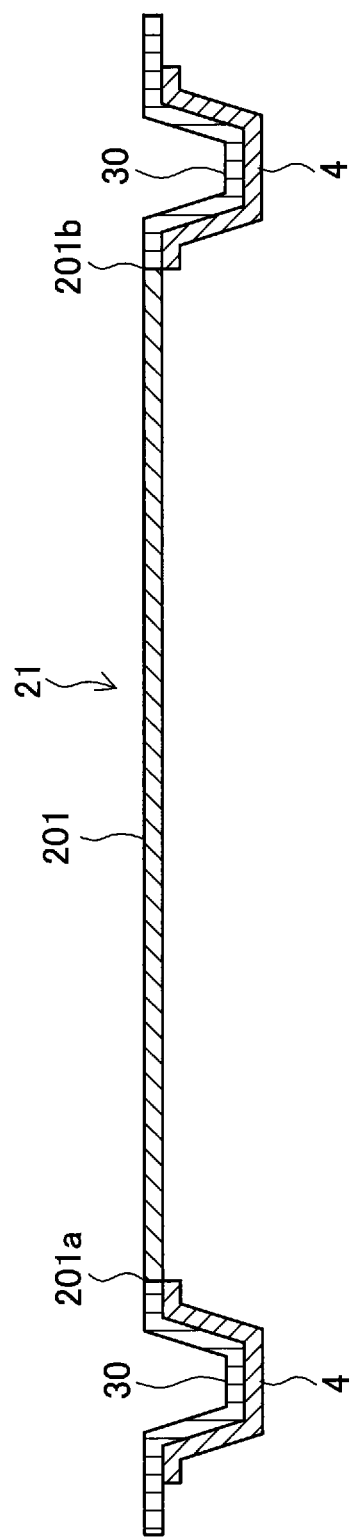
FIG. 13 is a cross-sectional view of the vehicle rear portion structure taken along a XIII-XIII cutting line of FIG. 11.

Next, the configuration of a vehicle rear portion structure 11 according to a third embodiment of the present invention is described. FIG. 11 is a lower perspective view showing the vehicle rear portion structure 11 according to the present embodiment. FIG. 12 is a cross-sectional view of the vehicle rear portion structure 11 taken along the XII-XII cutting line of FIG. 11. FIG. 13 is a cross-sectional view of the vehicle rear portion structure 11 taken along the XIII-XIII cutting line of FIG. 11.

As shown in FIG. 11, the vehicle rear portion structure 11 according to the present embodiment includes a rear floor panel 21 and the rear frames 4 and 4. As shown in FIG. 12, a left and right pair of concave sections 30 and 30 each having a gutter-like shape in which the upper side is opened and that extends in the vehicle length direction are provided at both ends in the vehicle width direction of the rear floor panel 21. The concave sections 30 are formed integrally with the rear floor panel 21. The rear floor panel 21 according to the present embodiment does not have the spare tire storage section shown in the above embodiments.

The rear frame 4 according to the present embodiment is a member that is formed of a steel sheet having the same tensile strength as the rear frame 4 included in the vehicle rear portion structure 10 according to the first embodiment and has a gutter-like shape in which the upper side is opened. The rear frame 4 according to the present embodiment may be, as shown in FIG. 11, a rear frame having such a length that the rear end 4*a* of the rear frame 4 is located more on the front side than the rear end of the rear floor panel 21 (that is, the rear end 30*a* of the concave section 30). The rear frame 4 may also be a rear frame having such a length that the rear end 4*a* of the rear frame 4 is at the same position as the rear end of the rear floor panel 21 in the vehicle length direction.

The concave section 30 according to the present embodiment is provided from the rear end of the rear floor panel 21 toward the front side of the vehicle. A part of the concave section 30 is joined to the rear frame 4. For example, as shown in FIG. 11 and FIG. 13, the outer side surfaces of the concave section 30 are joined to the inner side surfaces of the rear frame 4. Thereby, a part of an impact load that has acted on the rear floor panel 21 is transferred to the rear frame 4 via the concave section 30.

The steel sheet that forms the concave section 30 according to the present embodiment is, like in the first embodiment of the present invention, a steel sheet having a tensile strength higher than or equal to the tensile strength of the rear frame 4. For example, the tensile strength of the steel sheet that forms the concave section 30 is preferably more than or equal to 980 MPa.

By this configuration, when an impact load acts from the rear side of the vehicle, the rear floor panel 21 including the concave sections 30 undergoes buckling deformation, and can therefore absorb collision energy in a principal way. Thereby, the burden of absorption of collision energy by the rear frames 4 is reduced, and accordingly it becomes possible to reduce the wall thickness or the length of the rear frame 4. Furthermore, even in the case where a spare tire storage section is not provided in the rear floor panel 21 in order to reduce the weight and improve the living space in the vehicle by omitting a spare tire, the rear floor panel 21 can absorb collision energy in a principal way in place of the rear frames 4.

In the case where the concave section 30 and the rear frame 4 are joined together like in the second embodiment, it is preferable that side walls (the outer side surfaces) of the concave section 30 and side walls (the inner side surfaces) of the rear frame 4 be joined together via joint sections. The joint section refers to a portion where the side wall of the concave section 30 and the side wall of the rear frame 4 are joined together by welding, fastening, etc.

By the joint section, when an impact load acts on the rear floor panel 21 from the rear side of the vehicle, the joint section exhibits a behavior of the shear breaking mode. Thereby, the joint strength of the joint section is further increased, and hence joint breaking can be hindered. Therefore, the transfer of impact force to the inside of the vehicle and the entry of a colliding body or the like can be prevented. Thus, the collision safety of the car body can be enhanced.

In an intermediate section 201 located between the two concave sections 30 and 30 shown in FIG. 12 and FIG. 13, a region (high-rigidity region) having a rigidity higher than the rigidity of a portion (for example, the concave section 30) of the rear floor panel 21 on the outside of the intermediate section 201 may be provided. The high-rigidity region may be provided at least from one end 201a to the other end 201b in the vehicle width direction of the intermediate section 201. As described later, the high-rigidity region may be provided in the whole or part of the intermediate section 201.

By providing the high-rigidity region in the intermediate section 201 from one end 201a to the other end 201b in the vehicle width direction of the intermediate section 201, similarly also the pair of rear frames 4 are less likely to twist relatively. Consequently, the rear frame 4 is restrained to the rear floor panel 2 more reliably. Thereby, the deformation mode of the rear frame 4 is stabilized, and therefore the collision safety of the vehicle rear portion structure 1 can be caused to be exhibited as much as possible.

Furthermore, by providing the high-rigidity region in the intermediate section 201, the sound reduction index can be reduced. Thereby, the intermediate section 201 blocks noise such as road noise and vibration, and therefore noise and vibration can be hindered from being transmitted to the interior of the vehicle. Thus, the comfortableness of the interior of the vehicle can be improved.

Specific means for increasing the rigidity in the high-rigidity region of the intermediate section 201 will be described later.

In the intermediate section 201, a region (high-strength region) having a tensile strength higher than the tensile strength of a portion (for example, the concave section 30 or a portion on the outside of the concave section 30) of the rear floor panel 21 on the outside of the intermediate section 201 may be provided. The high-strength region may be provided at least from one end 201a to the other end 201b in the vehicle width direction of the intermediate section 201. The high-strength region may be provided in the whole or part of the intermediate section 201. By increasing the tensile strength of the intermediate section 201, even when an object collides against a portion of the rear floor panel 21 between the pair of rear frames 4 from the rear side of the vehicle, the intermediate section 201 can prevent the entry of the object toward the inside of the car.

Furthermore, when the rigidity of the intermediate section 201 is increased, the range allowing elastic deformation, in which the rigidity of the intermediate section 201 can be maintained, can be expanded. Thereby, the pair of rear frames 4 are less likely to twist relatively, and therefore collision safety can be further enhanced.

The rear floor panel 21 including the intermediate section 201 having the high-strength region is obtained by, for example, press-processing a tailored blank including a steel sheet section in which the tensile strength of the portion corresponding to the intermediate section 201 is set relatively high.

Figure 14:
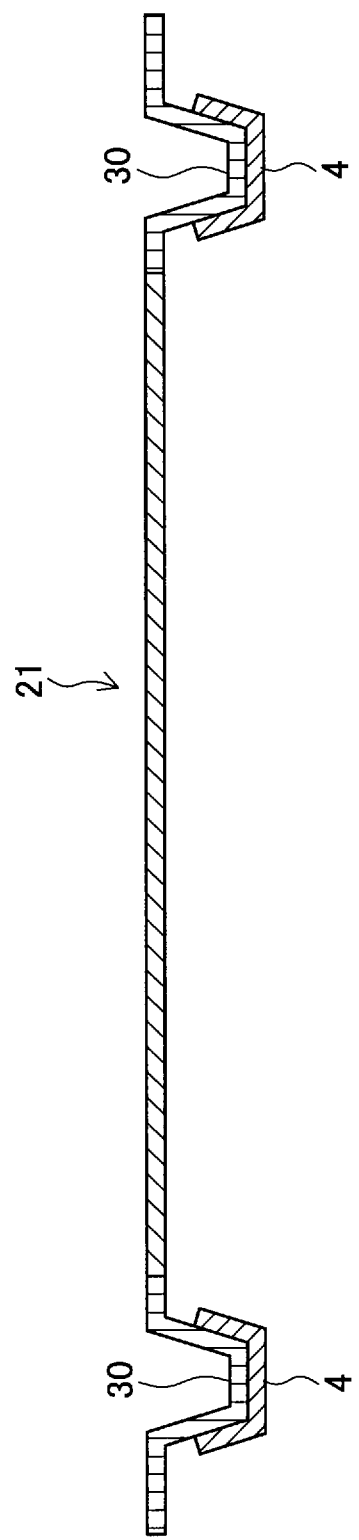
FIG. 14 is a cross-sectional view related to another example of the vehicle rear portion structure taken along the XIII-XIII cutting line of FIG. 11.

The rear frame 4 shown in FIG. 11 and FIG. 13 may not be provided with a flange. FIG. 14 is a cross-sectional view related to another example of the vehicle rear portion structure taken along the XIII-XIII cutting line of FIG. 11. The presence or absence of a flange in the rear frame 4 is not particularly limited as long as, as shown in FIG. 14, a rear frame 4 having no flange and the concave section 30 of the rear floor panel 20 are joined together by each other's side surfaces and/or bottom surfaces.

5. Specific Examples of Rigidity Increase

Next, specific techniques to increase the rigidity of the high-rigidity region in the case where the high-rigidity region is provided in the bottom surface section 300, the intermediate section 301, and the intermediate section 201 of the rear floor panel 2 (20, 21) of the vehicle rear portion structure 1 (10, 11) according to the first embodiment, the second embodiment, and the third embodiment of the present invention are described. In the following, examples of specific techniques in the case where the high-rigidity region is provided in the whole or part of the bottom surface section 300 according to the first embodiment of the present invention are described. These techniques can be similarly applied to the intermediate section 301 according to the second modification example of the first embodiment of the present invention, the bottom surface section 300 according to the second embodiment, and the intermediate section 201 according to the third embodiment.

Figure 15:
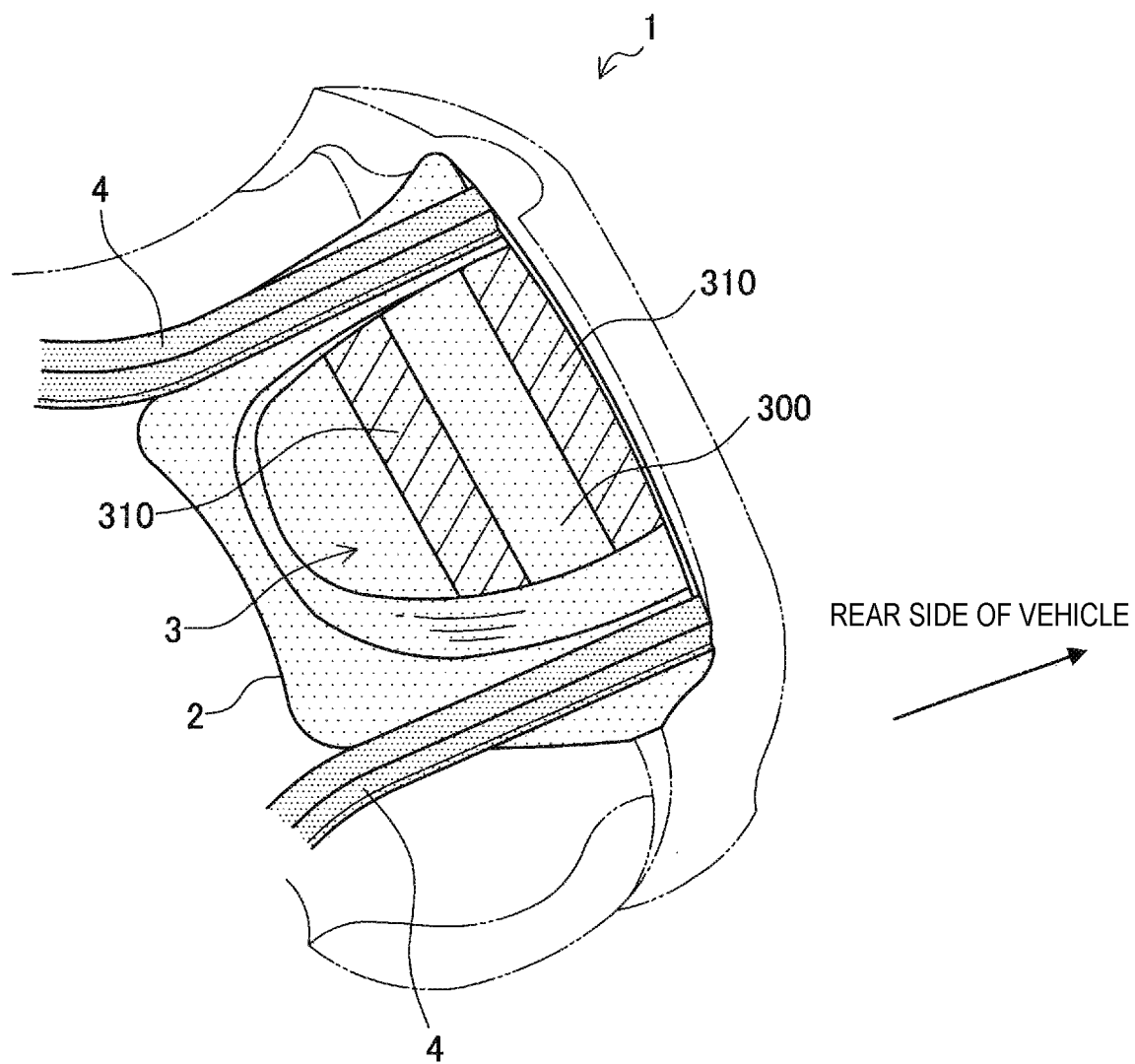
FIG. 15 is a diagram showing an example of high-rigidity regions provided in a bottom surface section according to an embodiment of the present invention.

FIG. 15 is a diagram showing an example of high-rigidity regions 310 provided in the bottom surface section 300 according to an embodiment of the present invention. As shown in FIG. 15, the high-rigidity region 310 is provided from one end to the other end in the vehicle width direction of the bottom surface section 300. By the high-rigidity regions 310 being provided in this way, a relative twist of both ends of the bottom surface section 300 can be suppressed. Consequently, also a relative twist of the pair of rear frames 4 is suppressed. Thereby, it becomes possible to absorb a larger amount of impact at the time of collision.

As shown in FIG. 15, a plurality of high-rigidity regions 310 may be provided in the bottom surface section 300, and high-rigidity regions 310 may be provided only in parts of the bottom surface section 300. As a matter of course, the high-rigidity region 310 may be provided on the entire surface of the bottom surface section 300. As shown in FIG. 15, a plurality of high-rigidity regions 310 may be provided in a row in the vehicle length direction. Further, a plurality of high-rigidity regions 310 may be provided so as to cross on the bottom surface section 300. In short, it is sufficient that the high-rigidity region 310 be provided so as to continue from one end to the other end in the vehicle width direction in at least a part of the bottom surface section 300.

A rigidity increase of the high-rigidity region 310 can be achieved by the means described below. For example, the sheet thickness of the metal sheet in the high-rigidity region 310 may be set larger than the sheet thickness of a portion of the rear floor panel 2 other than the high-rigidity region 310. In the present embodiment, the sheet thickness of the metal sheet in the high-rigidity region 310 may be set larger than the sheet thickness of a portion on the outside of the bottom surface section 300 (for example, the flat surface section 5 or a portion other than the bottom surface section 300 of the spare tire storage section 3). Thereby, the rigidity in the high-rigidity region 310 can be increased. The rear floor panel 2 including the high-rigidity region 310 in which the sheet thickness of the metal sheet is relatively large can be obtained by, for example, a tailored blank or a tailor rolled blank.

In the case where the high-rigidity region is provided in the intermediate section 301 according to the second modification example of the first embodiment, the sheet thickness of the metal sheet in the high-rigidity region may be set larger than the sheet thickness of a portion on the outside in the vehicle width direction of the intermediate section 301. In the case where the high-rigidity region is provided in the bottom surface section 300 according to the second embodiment, the sheet thickness of the metal sheet in the high-rigidity region may be set larger than the sheet thickness of a portion on the outside of the bottom surface section 300. In the case where the high-rigidity region is provided in the intermediate section 201 according to the third embodiment, the sheet thickness of the metal sheet in the high-rigidity region may be set larger than the sheet thickness of a portion on the outside in the vehicle width direction of the intermediate section 201.

Further, a sheet member made of a resin may be joined to the metal sheet in the high-rigidity region 310. The sheet member may be joined to one surface or both surfaces of the metal sheet in the high-rigidity region 310. In the case where the sheet member is joined to one surface of the metal sheet, the sheet member may be joined to either of the inside and the outside of the vehicle. The rigidity of the high-rigidity region 310 can be increased by joining the sheet member made of a resin to the metal sheet in the high-rigidity region 310.

The resin that forms the sheet member is preferably a foaming-hardening resin, for example. It is further preferable that the resin have vibration damping performance. The method for joining the sheet member and the metal sheet together is not particularly limited. For example, in the case where the resin that forms the sheet member is a foaming-hardening resin, the sheet member and the metal sheet may be joined together by the adhesive strength of the resin formed on the surface of the metal sheet.

Figure 16:
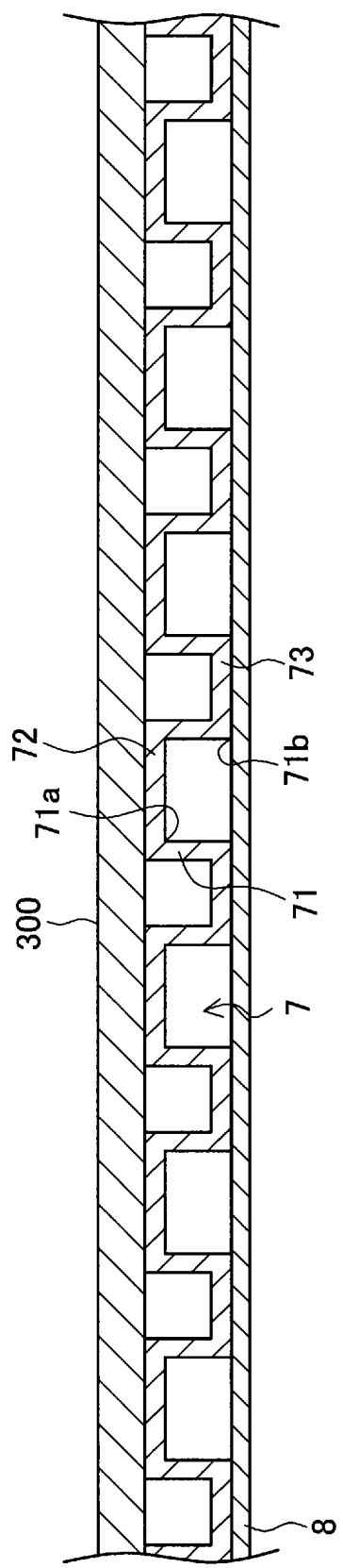
FIG. 16 is a diagram showing a configurational example of a resin structure body and a sheet member according to an embodiment of the present invention.

Further, a resin structure body may be joined along with the sheet member to the metal sheet in the high-rigidity region 310. FIG. 16 is a diagram showing a configurational example of a resin structure body 7 and a sheet member 8 according to an embodiment of the present invention. Referring to FIG. 16, the resin structure body 7 according to the present embodiment includes a plurality of cylindrical bodies 71 of the same height, a top surface 72 covering one end portion 71a of each of the cylindrical bodies 71, and a base section 73 connecting other end portions 71b of cylindrical bodies 71. A sheet member 8 made of a resin or paper is joined to the base sections 73.

The resin structure body 7 is sandwiched between the metal sheet of the bottom surface section 300 in the high-rigidity region 310 and the sheet member 8, and thereby the overall thickness including the metal sheet of the bottom surface section 300 in the high-rigidity region 310 can be increased. Also a weight reduction with respect to rigidity can be achieved by increasing the rigidity of the high-rigidity region 310 using a resin having a smaller density than the metal sheet.

The structure of the resin structure body 7 is not limited to the example shown in FIG. 16. For example, the height, and the size and the pitch in the in-plane direction of the cylindrical body 71, the shapes of the top surface 72 and the base section 73 (for example, a circle or a honeycomb structure), etc. may be set in accordance with performance required of the high-rigidity region 310 for which the resin structure body 7 is used, etc., as appropriate.

The resin structure body 7 may be joined to one surface or both surfaces of the metal sheet in the high-rigidity region 310. In the case where the resin structure body 7 is joined to one surface of the metal sheet, the resin structure body 7 may be joined to either of the inside and the outside of the vehicle. However, the resin structure body 7 is preferably joined to the inside of the vehicle in order to avoid a reduction of the effect of rigidity increase caused by damage due to collision of an object from the outside. It is also possible to employ a configuration in which the resin structure body 7 is joined to one surface of the metal sheet in the high-rigidity region 310, and the sheet member is joined to the other surface.

Further, a concave-convex shape may be formed on the metal sheet in the high-rigidity region 310. The concave-convex shape is, for example, a shape composed of a concave section or a convex section formed on a surface of the metal sheet. The proportion of flat surfaces (surfaces on which a concave-convex shape is not formed) in the high-rigidity region 310 is reduced by a concave-convex shape being formed on the metal sheet in the high-rigidity region 310. Thereby, the rigidity of the metal sheet in the high-rigidity region 310 is improved. The concave-convex shape may be formed by, for example, embossing or the like. More specifically, the concave-convex shape disclosed in WO 2013/94691 may be used as the concave-convex shape for the high-rigidity region 310.

The means for rigidity increase described above may be used in combination for the metal sheet in the high-rigidity region 310, as appropriate. For example, the concave-convex shape may be formed on the metal sheet in the high-rigidity region 310 by embossing, and the resin structure body and/or the sheet member may be joined to the metal sheet.

The means for rigidity increase described above are only examples, and known technologies for rigidity increase may be applied to the high-rigidity region as long as the rigidity of the high-rigidity region can be improved in the bottom surface section 300 etc.

Hereinabove, specific examples of rigidity increase are described.

6. Specific Examples of Joint Section

Next, specific examples of the joint section in the case where the rear floor panel 20 (21) and the rear frame 4 of the vehicle rear portion structure 10 (11) according to the second embodiment and the third embodiment of the present invention are joined together by joining together side walls of the frame shape section 51 or side walls of the concave section 30 and side walls of the rear frame 4 via joint sections are described. In the following, examples of specific techniques of the joint section provided at the side wall of the frame shape section 51 and the side wall of the rear frame 4 according to the second embodiment of the present invention are described. These techniques can be similarly applied to the joint section provided at the side wall of the concave section 30 and the side wall of the rear frame 4 according to the third embodiment of the present invention.

Figure 17:
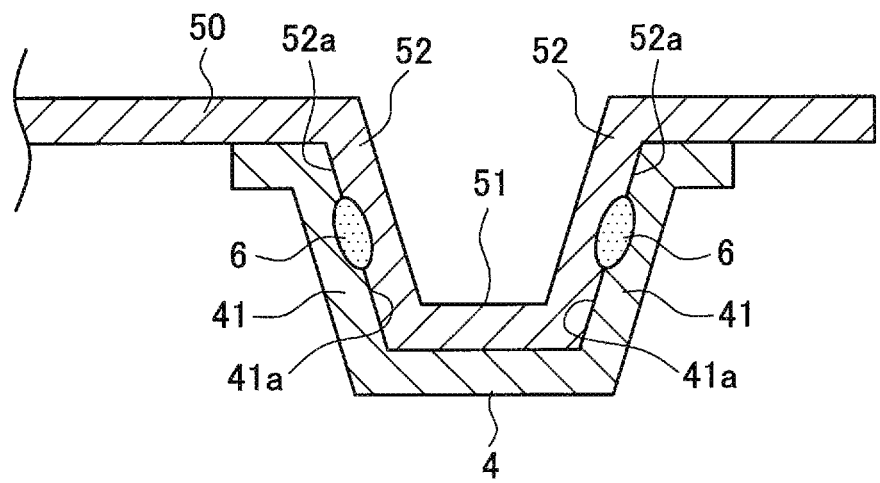
FIG. 17 is a cross-sectional view showing an example of joint sections according to an embodiment of the present invention.

FIG. 17 is a cross-sectional view showing an example of joint sections 6 according to an embodiment of the present invention. The cross-sectional view is a diagram showing a cross section of each member in a portion where the frame shape section 51 and the rear frame 4 according to the second embodiment of the present invention are joined together (see FIG. 8). As shown in FIG. 17, the joint section 6 is a portion that joins together an outer side surface 52a of a side wall 52 of the frame shape section 51 and an inner side surface 41a of a side wall 41 of the rear frame 4.

The joint section 6 shown in FIG. 17 schematically shows a portion that joins together the outer side surface 52a and the inner side surface 41a; but the position, range, and size of the actual joint section 6 are not limited to the example shown in FIG. 17, and vary in accordance with the joining manner. For example, the joint section 6 shown in FIG. 17 may be a nugget that is formed between the side wall 52 and the side wall 41 by spot welding. In another example, the position (the position in the vehicle length direction or the vehicle height direction) where the joint section 6 is formed may be the whole or part of the portion where the outer side surface 52a and the inner side surface 41a are in contact with each other. The range of the joint section 6 may be a range in which one or both of the side wall 52 of the frame shape section 51 and the side wall 41 of the rear frame 4 are pierced, or may be a contact portion between the side wall 52 and the side wall 41 and its vicinity. The size of the joint section 6 may be set in accordance with the joining means, the position of formation, etc., as appropriate. A plurality of joint sections that join the outer side surface 52a and the inner side surface 41a together may be formed as one joint section 6.

The joint section 6 may be a weld, for example. That is, the joint section 6 may be a portion formed by welding. The welding may be laser welding, arc welding, arc spot welding, spot welding, or the like. The welding may also be hybrid welding in which laser welding and arc welding are combined.

Figure 18:
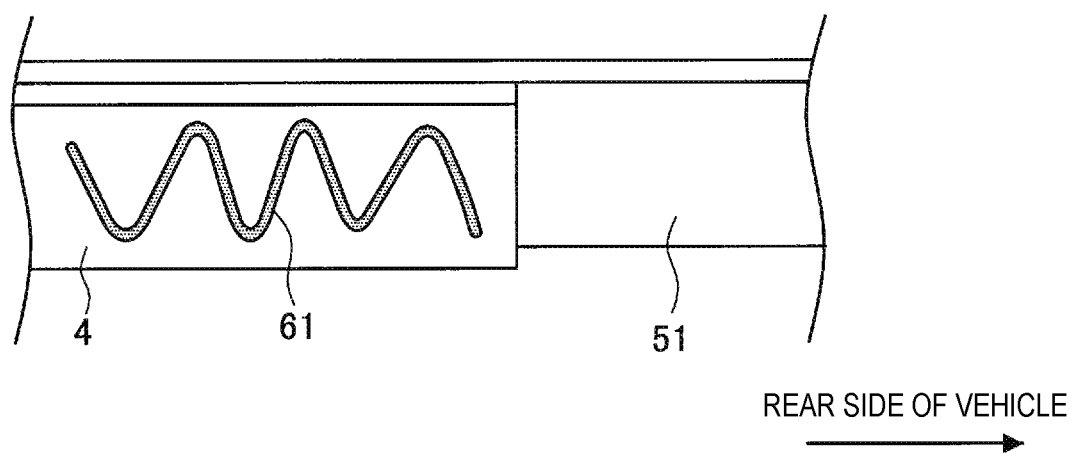
FIG. 18 is a diagram showing an example of a weld formed in a line continuing while winding in a vehicle length direction.

The weld may be formed in a line continuing while winding in the vehicle length direction. FIG. 18 is a diagram showing an example of a weld 61 that is formed in a line continuing while winding in the vehicle length direction. As shown in FIG. 18, the weld 61 joining the frame shape section 51 and the rear frame 4 together may be formed in a wavelike fashion so as to continue in the vehicle length direction and vibrate in the vehicle height direction. Thereby, a longer joint line length can be obtained. Therefore, the joint strength between the frame shape section 51 and the rear frame 4 can be increased.

The joint section 6 may also be, for example, a fastening section. The fastening section may be obtained by, for example, a bolt and a nut, a rivet, or the like. Thereby, the outer side surface 52a of the frame shape section 51 and the inner side surface 41a of the rear frame 4 are joined together by fastening. The joint section 6 may also be, for example, an adhesion section. The adhesion section may be obtained by, for example, a known adhesive or the like such as a resin. Thereby, the outer side surface 52a of the frame shape section 51 and the inner side surface 41a of the rear frame 4 are joined together by adhesion. The joint section 6 may also be, for example, a sticking joint section. The sticking joint section may be obtained by, for example, connecting together the outer side surface 52a of the frame shape section 51 and the inner side surface 41a of the rear frame 4 by plastic deformation in a state where both surfaces are kept in contact. The sticking joint section may also be obtained by sticking-joining using a joining member such as a rivet.

7. Specific Examples of Other Reinforcing Means (Fitting Groove)

Next, examples in which, in the joint between the rear floor panel 20 (21) and the rear frame 4 of the vehicle rear portion structure 10 (11) according to the second embodiment and the third embodiment of the present invention, the frame shape section 51 and the rear frame 4 are each provided with fitting grooves are described. In the following, fitting grooves provided on a side wall of the frame shape section 51 of the rear floor panel 20 and a side wall of the rear frame 4 according to the second embodiment of the present invention are described. The fitting grooves can be similarly used for a side wall of the concave section 30 and a side wall of the rear frame 4 according to the third embodiment of the present invention.

First, the side wall of a part of the frame shape section 51 may be provided with one or a plurality of first fitting grooves extending in the vehicle height direction. In this case, a side wall of the rear frame 4 is provided with a second fitting groove corresponding to the first fitting groove provided in the frame shape section 51. When the frame shape section 51 and the rear frame 4 are being joined together, the first fitting groove can be fitted into the second fitting groove. These fitting grooves may be formed by, for example, bending or the like.

Figure 19A:
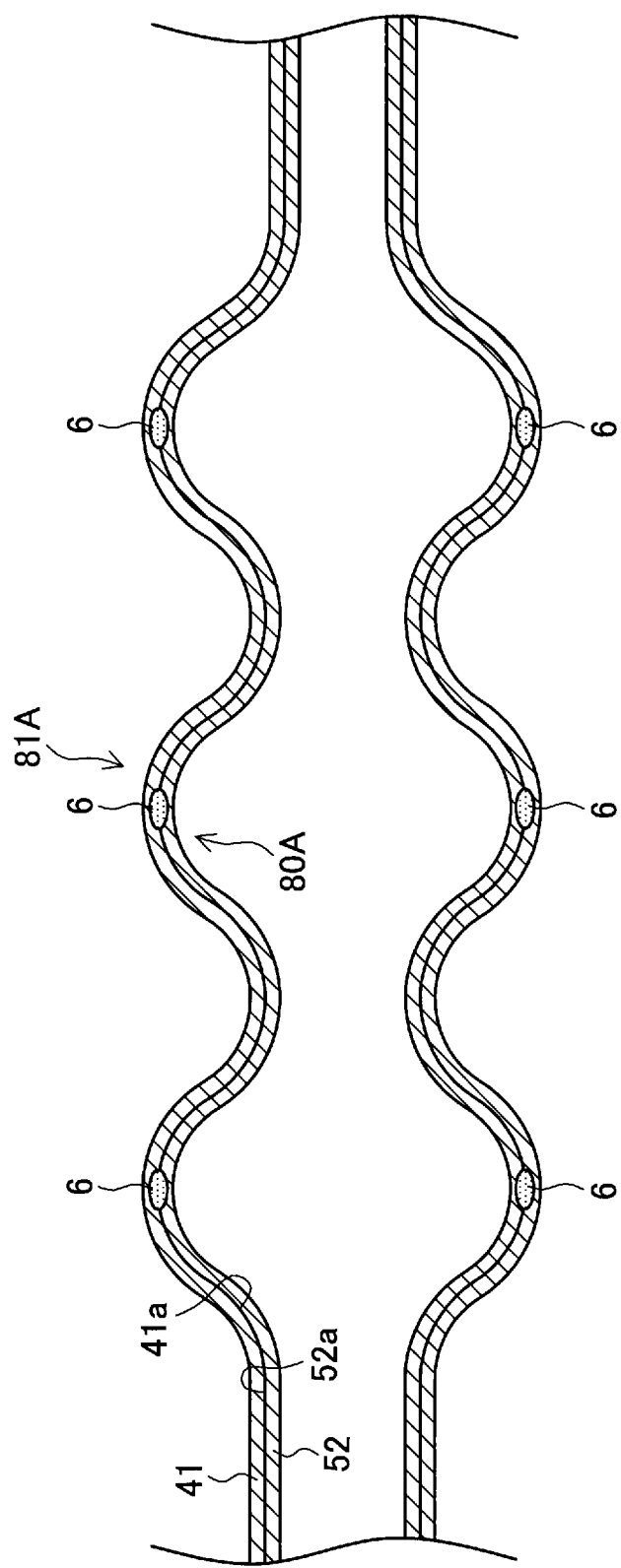
FIG. 19A is a cross-sectional view showing a first example showing a state of a frame shape section and a rear frame in a case where first fitting grooves are fitted into second fitting grooves.

FIG. 19A is a cross-sectional view showing a first example showing a state of the frame shape section 51 and the rear frame 4 in the case where first fitting grooves 80A are fitted into second fitting grooves 81A. FIG. 19A is a horizontal cross-sectional view of the frame shape section 51 and the rear frame 4 as seen from above the vehicle. As shown in FIG. 19A, a part of the side wall 52 of the frame shape section 51 and a part of the side wall 41 of the rear frame 4 are each provided with a portion winding in the vehicle length direction. Of these portions, portions protruding to the outside of the side wall 52 and the side wall 41 are the first fitting groove 80A and the second fitting groove 81A. Since the first fitting groove 80A is fitted into the second fitting groove 81A, the outer side surface 52a of the frame shape section 51 and the inner side surface 41a of the rear frame 4 are in contact with each other also in the portion of the fitting groove.

In the case where the frame shape section 51 and the rear frame 4 are not provided with the fitting grooves, when an impact load acts on the rear floor panel 20 from the rear side of the vehicle, load transfer from the rear floor panel 20 to the rear frame 4 is performed only via a joint place such as the joint section 6. Consequently, when the transferred load is larger than the joint strength, joint breaking between the frame shape section 51 and the rear frame 4 occurs, and the transfer of impact force to the inside of the vehicle and the entry of a colliding body or the like may occur. Thus, the frame shape section 51 and the rear frame 4 are provided with the fitting grooves, and the fitting grooves are fitted to each other; thereby, the impact load can be transferred from the rear floor panel 20 to the rear frame 4 via the portions where the fitting grooves are in contact with each other. Therefore, the overall joint strength between the frame shape section 51 and the rear frame 4 can be increased. Thereby, collision safety can be improved.

Although the joint section 6 shown in FIG. 19A is provided in the outermost place of the first fitting groove 80A and the second fitting groove 81A, the position where the joint section 6 is provided is not particularly limited. The fitting grooves may be provided even in the case where the joint section 6 is not provided on the side wall of the frame shape section 51 or the rear frame 4.

Figure 19B:
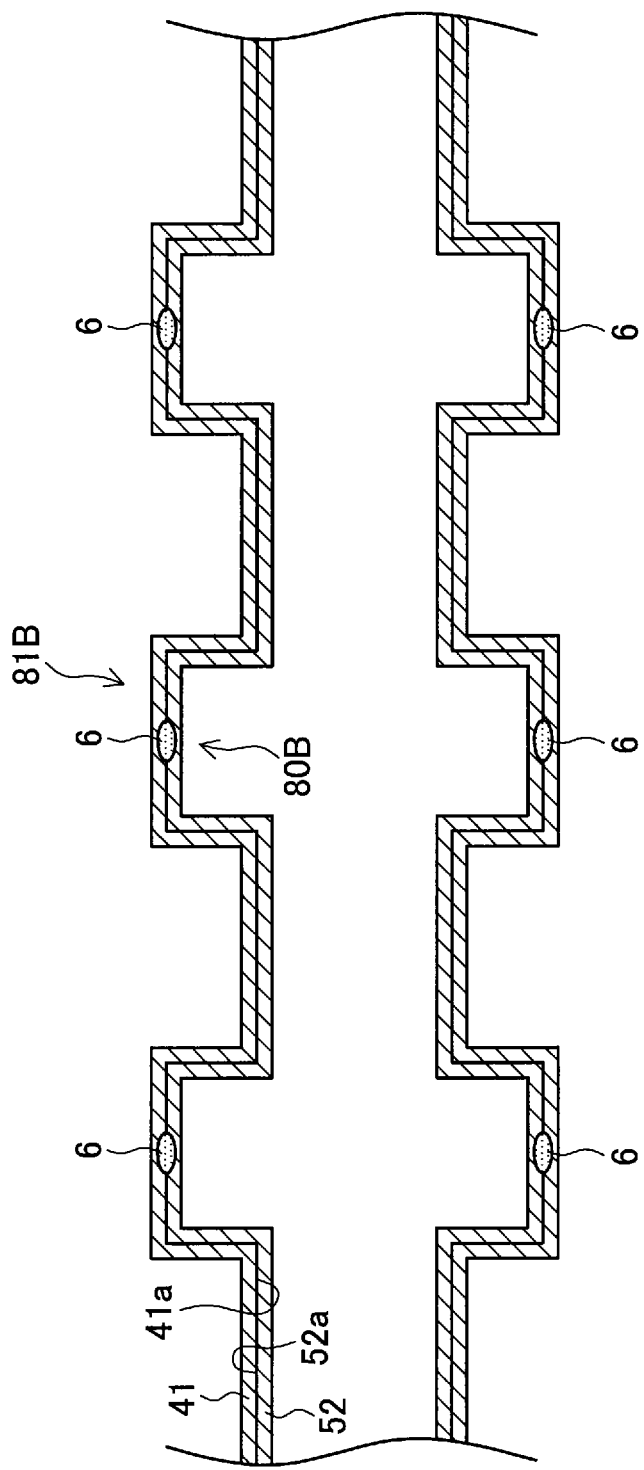
FIG. 19B is a cross-sectional view showing a second example showing a state of a frame shape section and a rear frame in a case where first fitting grooves are fitted into second fitting grooves.

The shape (cross-sectional shape) of the first fitting groove and the second fitting groove is not limited to the example shown in FIG. 19A. FIG. 19B is a cross-sectional view showing a second example of a state of the frame shape section 51 and the rear frame 4 in the case where first fitting grooves 80B are fitted into second fitting grooves 81B. FIG. 19B is a horizontal cross-sectional view of the frame shape section 51 and the rear frame 4 as seen from above the vehicle. As shown in FIG. 19B, each of the first fitting groove 80B and the second fitting groove 81B may have a U-like cross-sectional shape in a planar view. The shape of the first fitting groove and the second fitting groove is not particularly limited as long as fitting grooves can be in contact with each other.

Although in the examples shown in FIG. 19A and FIG. 19B each of the first fitting groove and the second fitting groove has a shape in which the side wall of each of the frame shape section 51 and the rear frame 4 protrudes to the outside of this side wall, the present invention is not limited to the examples. For example, the side wall of each of the frame shape section 51 and the rear frame 4 may have portions protruding to the inside of this side wall, and each of the first fitting groove and the second fitting groove may be a fitting groove provided between adjacent ones of the protruding portions. Even in this configuration, the working of transfer of an impact load via the portions where the fitting grooves are in contact with each other is brought about, and the joint strength can be increased.

The length in the vehicle width direction of the first fitting groove and the second fitting groove (that is, the depth of the groove in the fitting groove) may be the same from the opening section to the bottom surface section of the frame shape section 51 and the rear frame 4. The length in the vehicle width direction of each of the fitting grooves mentioned above may also change from the opening section mentioned above to the bottom surface section mentioned above. For example, in the case where each of the fitting grooves mentioned above protrudes to the outside of the side wall as shown in FIG. 19A and FIG. 19B, the length in the vehicle width direction of each of the fitting grooves mentioned above may decrease with transition from the opening section mentioned above to the bottom surface section mentioned above. This configuration is favorable in terms of moldability.

(Contact Member)

Next, examples in which, in the joint between the rear floor panel 20 (21) and the rear frame 4 of the vehicle rear portion structure 10 (11) according to the second embodiment and the third embodiment of the present invention, a contact member is provided inside the frame shape section 51 are described. In the following, a contact member provided inside the frame shape section 51 of the rear floor panel 20 according to the second embodiment of the present invention is described. The contact member can be similarly used for the inside of the concave section 30 according to the third embodiment of the present invention.

A contact member in contact with both facing side walls (that is, both facing inner side surfaces) of the frame shape section 51 may be provided inside the frame shape section 51. That is, the contact member may be provided so as to link both side walls inside the frame shape section 51.

Figure 20A:
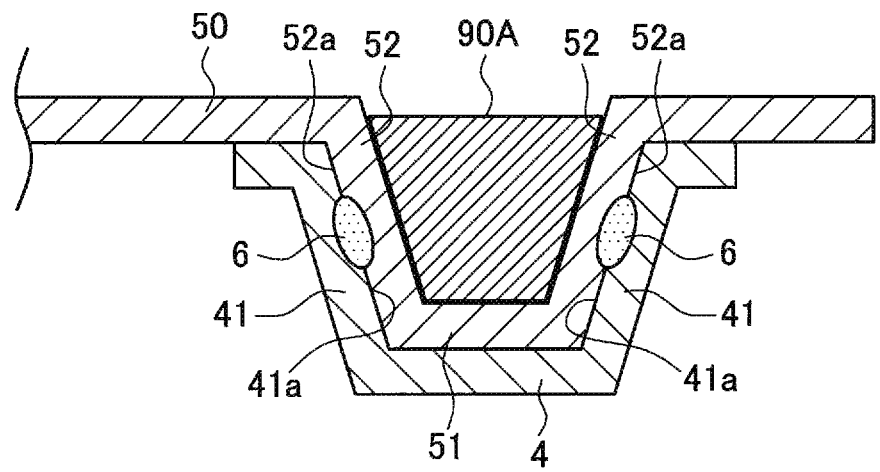
FIG. 20A is a diagram showing a first example of a contact member.

FIG. 20A is a diagram showing a first example of the contact member. As shown in FIG. 20A, a contact member 90A may be provided so as to fill the space inside the frame shape section 51. In this case, the contact member 90A is provided in contact with the side walls 52 of the frame shape section 51.

In the case where the joint section 6 is provided on the side wall 52 of the frame shape section 51 and the side wall 41 of the rear frame 4, when the rear floor panel 20 receives an impact load, there is a likelihood that the side wall 52 and the side wall 41 will deform in a direction in which they move away from each other, due to the load. Specifically, there is a case where the side wall 52 of the frame shape section 51 falls into the inside of the frame shape section 51 due to the load. Consequently, breaking due to a peeling mode of the joint section 6 is likely to occur.

Thus, the contact member 90A is provided inside the frame shape section 51, and thereby the falling into the inside of the side wall 52 of the frame shape section 51 can be suppressed. Hence, breaking due to the peeling mode of the joint section 6 can be prevented. Therefore, the joint strength between the frame shape section 51 and the rear frame 4 can be increased.

Figure 20B:
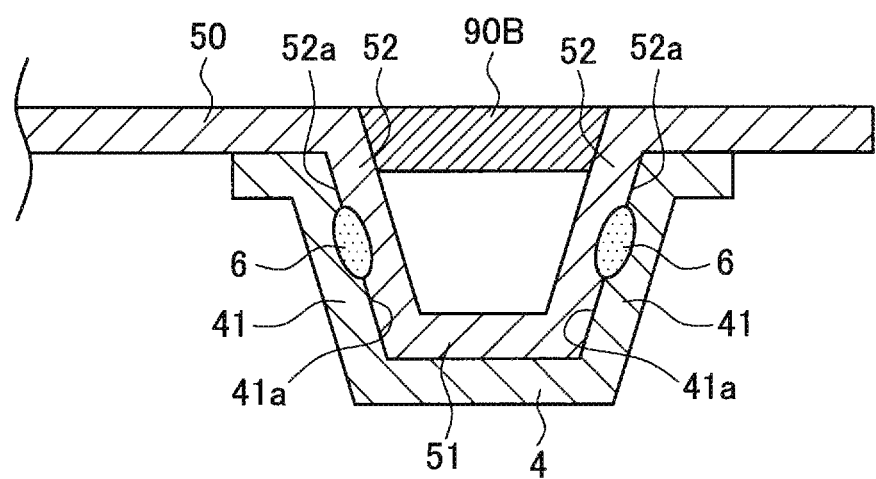
FIG. 20B is a diagram showing a second example of the contact member.

It is sufficient that the contact member be provided in contact with both facing side walls of the frame shape section 51. FIG. 20B is a diagram showing a second example of the contact member. As shown in FIG. 20B, a contact member 90B that links parts of the side walls 52 (in FIG. 20B, upper portions of the side walls 52) of the frame shape section 51 in a cross-sectional view orthogonal to the vehicle length direction may be provided. Thereby, even when force whereby the side wall 52 falls into the inside of the frame shape section 51 acts due to an impact load, the falling can be suppressed by the contact member 90B. The size and the contact position of the contact member inside the frame shape section 51 in a cross-sectional view orthogonal to the vehicle length direction may be set in accordance with the required strength, rigidity, weight, production cost, etc. of the vehicle rear portion structure 1, as appropriate.

The installation position of the contact member in the vehicle length direction is not particularly limited. However, in order to prevent breaking due to the peeling mode of the joint section 6 more reliably, it is preferable that the contact member be provided to correspond to the position where the joint section 6 is provided in the vehicle length direction. The installation position and the amount of installation of the contact member in the vehicle length direction may be set in accordance with the required strength, rigidity, weight, production cost, etc. of the vehicle rear portion structure 1, as appropriate.

The contact member may be formed of, for example, a resin such as a foaming-hardening resin. The contact member may also be formed of, for example, a metal piece or a metal sheet. The contact member may not necessarily be fixed to the inner side surfaces of the side walls 52 of the frame shape section 51. That is, the contact member does not need to adhere to the inner side surfaces of the side walls 52, and may be stuck to at least parts of the inner side surfaces of the side walls 52.

The fitting groove and the contact member described above may be used simultaneously for the frame shape section 51 according to the second embodiment of the present invention and the concave section 30 according to the third embodiment, and the rear frame 4.

8. Conclusions

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

Although the above embodiments are described using a steel sheet as the metal sheet that forms the vehicle rear portion structure 1, the metal sheet is not limited to this, and also vehicle rear portion structures formed from other metal sheets exhibit effects similarly. For example, also a vehicle rear portion structure in which one or both of a rear floor panel and a rear frame are molded from an aluminum alloy sheet exhibits effects similar to the effects shown in the above embodiments.

REFERENCE SIGNS LIST 1, 10, 11 vehicle rear portion structure
2, 20, 21 rear floor panel
3, 30 concave section (spare tire storage section)
4 rear frame
5, 50 flat surface section
6 joint section
7 resin structure body
8 sheet member
41 side wall of rear frame 4
51 frame shape section
52 side wall of frame shape section 51
71 cylindrical body
72 top surface
73 base section
80A, 80B first fitting groove
81A, 81B second fitting groove
90A, 90B contact member
201, 301 intermediate section
300 bottom surface section
310 high-rigidity region

The invention claimed is:

1. A vehicle rear portion structure comprising:
a pair of rear frames provided in a vehicle length direction; and
a rear floor panel joined to the pair of rear frames,
wherein the rear floor panel has a concave section,
the concave section extends from a rear side of a vehicle toward a front side of the vehicle,
the concave section being formed of a metal sheet, and
the metal sheet having a tensile strength more than a tensile strength of the pair of rear frames.

2. The vehicle rear portion structure according to claim 1, wherein the rear floor panel has a pair of flat surface sections at both ends in a vehicle width direction and is joined to the pair of rear frames via the pair of flat surface sections, and
the concave section is provided between the pair of flat surface sections.

3. The vehicle rear portion structure according to claim 2, wherein each of the pair of flat surface sections has a frame shape section extending in a vehicle length direction, and
at least parts of the frame shape sections of the pair of flat surface sections are joined to the pair of rear frames.

4. The vehicle rear portion structure according to claim 3, wherein a side wall of at least a part of each of the frame shape sections and a side wall of each of the pair of rear frames are joined together via a joint section.

5. The vehicle rear portion structure according to claim 3, wherein a side wall of at least a part of each of the frame shape sections is provided with a first fitting groove extending in a vehicle height direction,
a side wall of each of the pair of rear frames is provided with a second fitting groove corresponding to the first fitting groove, and
the first fitting groove is fitted into the second fitting groove.

6. The vehicle rear portion structure according to claim 3, wherein a contact member in contact with both facing side walls of the frame shape section is provided inside the frame shape section.

7. The vehicle rear portion structure according to claim 2, wherein the concave section is a spare tire storage section.

8. The vehicle rear portion structure according to claim 7, wherein a high-rigidity region having a rigidity higher than a rigidity of the pair of flat surface sections is provided in a bottom surface section of the spare tire storage section at least from one end to another end in a vehicle width direction of the bottom surface section.

9. The vehicle rear portion structure according to claim 7, wherein a high-strength region having a tensile strength higher than a tensile strength of the pair of flat surface sections is provided in a bottom surface section of the spare tire storage section at least from one end to another end in a vehicle width direction of the bottom surface section.

10. The vehicle rear portion structure according to claim 2, wherein the concave section has a plurality of gutter-like shapes extending in a vehicle length direction and juxtaposed in a vehicle width direction.

11. The vehicle rear portion structure according to claim 1, wherein the concave section is provided individually at each of both ends in a vehicle width direction of the rear floor panel, and
at least a part of each of the concave sections is in each of the rear frames provided in a vehicle length direction and is joined to each of the pair of rear frames.

12. The vehicle rear portion structure according to claim 11, wherein a side wall of at least a part of each of the concave sections and a side wall of each of the pair of rear frames are joined together via a joint section.

13. The vehicle rear portion structure according to claim 11, wherein a side wall of at least a part of each of the concave sections is provided with a first fitting groove extending in a vehicle height direction,
a side wall of each of the pair of rear frames is provided with a second fitting groove corresponding to the first fitting groove, and
the first fitting groove is fitted into the second fitting groove.

14. The vehicle rear portion structure according to claim 11, wherein a contact member in contact with both facing side walls of the concave section is provided inside the concave section.

15. The vehicle rear portion structure according to claim 11,
   wherein, in an intermediate section located between the concave sections in a vehicle width direction in the rear floor panel, a high-rigidity region having a rigidity higher than a rigidity of a portion on an outside in the vehicle width direction of the intermediate section in the rear floor panel is provided from one end to another end in the vehicle width direction of the intermediate section.

16. The vehicle rear portion structure according to claim 11,
   wherein, in an intermediate section located between the concave sections in a vehicle width direction in the rear floor panel, a high-strength region having a tensile strength higher than a tensile strength of a portion on an outside in the vehicle width direction of the intermediate section in the rear floor panel is provided from one end to another end in the vehicle width direction of the intermediate section.

17. The vehicle rear portion structure according to claim 8,
   wherein a sheet thickness of the metal sheet in the high-rigidity region is larger than a sheet thickness of the metal sheet in a portion other than the high-rigidity region in the rear floor panel.

18. The vehicle rear portion structure according to claim 15,
   wherein a sheet thickness of the metal sheet in the high-rigidity region is larger than a sheet thickness of the metal sheet in a portion other than the high-rigidity region in the rear floor panel.

19. The vehicle rear portion structure according to claim 11,
   wherein the concave section is provided from a rear end in a vehicle length direction of the rear floor panel.

20. The vehicle rear portion structure according to claim 11,
   wherein, in a vehicle length direction, a rear end of the concave section is located more on a rear side than rear ends of the pair of rear frames.

* * * * *